United States Patent [19]

Christensen et al.

[11] Patent Number: 4,736,306

[45] Date of Patent: Apr. 5, 1988

[54] SYSTEM FOR CONVERSION BETWEEN THE BOUNDARY REPRESENTATION MODEL AND A CONSTRUCTIVE SOLID GEOMETRY MODEL OF AN OBJECT

[75] Inventors: Noel C. Christensen; James D. Emery; Maurice L. Smith, all of Kansas City, Mo.

[73] Assignee: The United States of America as represented by the United States Department of Energy, Washington, D.C.

[21] Appl. No.: 728,367

[22] Filed: Apr. 29, 1985

[51] Int. Cl.$^4$ .................. G06F 15/18; G05B 19/18
[52] U.S. Cl. .................. 364/513; 364/171; 364/191; 364/474; 364/522
[58] Field of Search ............... 364/513, 200 MS File, 364/900 MS File, 474, 191-193, 171, 188, 521, 522, 475

[56] References Cited

U.S. PATENT DOCUMENTS

| | | | |
|---|---|---|---|
| 3,534,396 | 10/1970 | Hart et al. | 364/474 |
| 3,548,173 | 12/1970 | Pascoe et al. | 364/474 |
| 4,393,450 | 7/1983 | Jerard | 364/475 |
| 4,523,270 | 6/1985 | Kishi et al. | 364/191 |
| 4,530,046 | 7/1985 | Nunekata et al. | 364/191 |
| 4,551,810 | 11/1985 | Levine | 364/191 |
| 4,556,957 | 12/1985 | Ichikawa | 364/191 |
| 4,569,014 | 2/1986 | Kishi et al. | 364/191 |
| 4,617,623 | 10/1986 | Inoue et al. | 364/474 |
| 4,618,924 | 10/1986 | Hinds | 364/474 |
| 4,641,270 | 2/1987 | Lalloz et al. | 364/468 |

OTHER PUBLICATIONS

Requicha, A. A. G. & Voelcker, H. B., "Solid: Modeling: A Historical Summary and Contemporary Assessment", IEEE Computer Graphics & Applications, Mar. 1982; pp. 9-24.

Hinds, J. K. & Kuan, L. P., "Sculptered Surface Technology as a Unified Approach to Geometric Definition", Advanced Manufacturing Technology, ed. by P. B. Lake, North-Holland Publishing Co., 1980, pp. 19-40.

Pratt, "Solid Modeling and the Interface Between Design and Manufacture", IEEE CG & A, 7/84, pp. 52-59.

Hummel, "KU/NBS Internship-Final Report", U. of Kansas Center for Research, Inc., 8-84.

Olson, "Computer-Aided Process Planning of Machined Metal Parts", Tech. Report ARLCB-TR-8 4027, Benet Weapons Lab, LCWSL, Watervliet, NY, 12189, Sep. 1984.

Krouse, "Shopping for a Solid Modeler", Machine Design, 1-20-83, pp. 56-63.

(List continued on next page.)

*Primary Examiner*—Jerry Smith
*Assistant Examiner*—John R. Lastova
*Attorney, Agent, or Firm*—James H. Chafin; George H. Libman; Judson R. Hightower

[57] ABSTRACT

A system converts from the boundary representation of an object to the constructive solid geometry representation thereof. The system converts the boundary representation of the object into elemental atomic geometrical units or I-bodies which are in the shape of stock primitives or regularized intersections of stock primitives. These elemental atomic geometrical units are then represented in symbolic form. The symbolic representations of the elemental atomic geometrical units are then assembled heuristically to form a constructive solid geometry representation of the object usable for manufacturing thereof. Artificial intelligence is used to determine the best constructive solid geometry representation from the boundary representation of the object. Heuristic criteria are adapted to the manufacturing environment for which the device is to be utilized. The surface finish, tolerance, and other information associated with each surface of the boundary representation of the object are mapped onto the constructive solid geometry representation of the object to produce an enhanced solid geometry representation, particularly useful for computer-aided manufacture of the object.

41 Claims, 18 Drawing Sheets

OTHER PUBLICATIONS

Krouse, "Sorting Out the Solid Modelers", Machine Design, 2-10-83, pp. 94-101.

Choi et al., "Automatic Recognition of Machined Surfaces from a 3-D Solid Model", Computer-Aided Design, vol. 16, No. 2, 3/84, pp. 84-86.

Voelcker et al., "Geometric Modeling of Mechanical Parts and Processes", Computer Magazine, Dec. 1977, pp. 48-57.

Bauer et al., "Geometric Modeling: A Survey", Computer-Aided Design, vol. 11, No. 5, Sep. 1979, pp 253-272.

Descotti et al., "GARI: A Problem Solver That Plan How to Machine Mechanical Parts", IJCAI: 7, Vancouver, Canada, Aug. 1981, pp. 766-772.

Matsushima et al., "The Integration of CAD and CAM by Application of AI Techniques", CIRP, vol. 3 2/1/82, pp. 329-332.

CLEAVER

REBIRTH

ONE-STEP

TOTAL-MINUS-NEGATIVES

UNION-OF-POSITIVES

UNION-OF-SECTIONS

GROW

COMPLETED – IGROUP

FIG. 9 MISSING - FACELETS

IBODIES OF ENCLOSING IGROUP

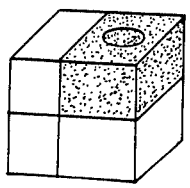
FIG.14a — THE ORIGINAL ENCLOSING IGROUP SUPPLIED BY CLEAVER
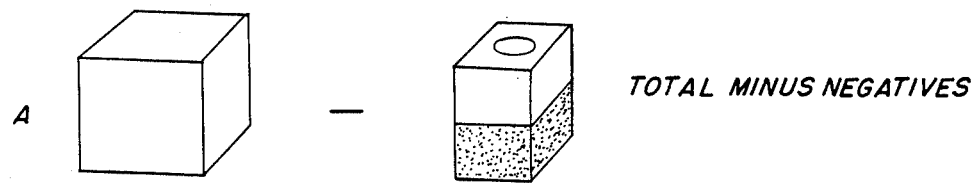
A — TOTAL MINUS NEGATIVES
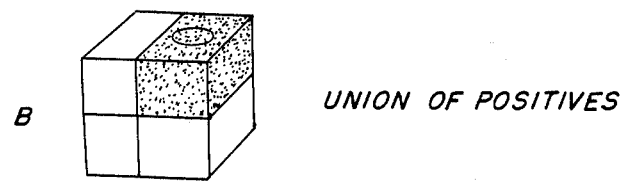
B — UNION OF POSITIVES
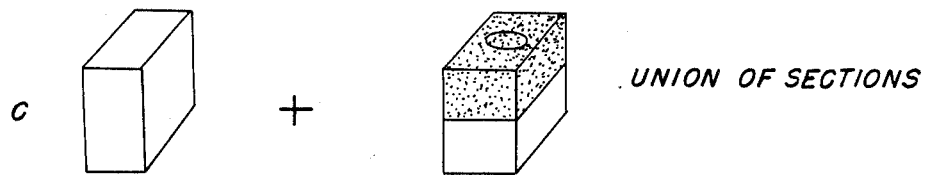
C — UNION OF SECTIONS
FIG.14b
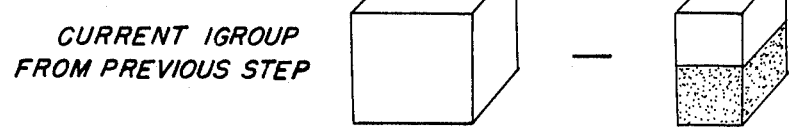
CURRENT IGROUP FROM PREVIOUS STEP
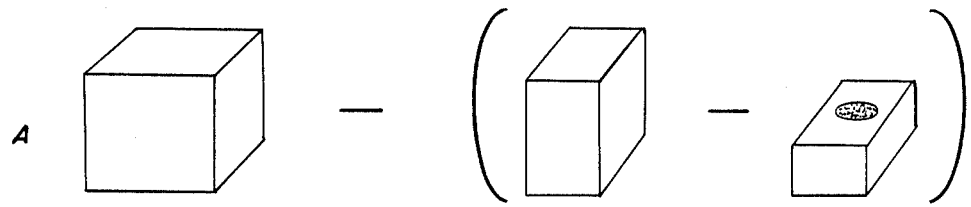
A
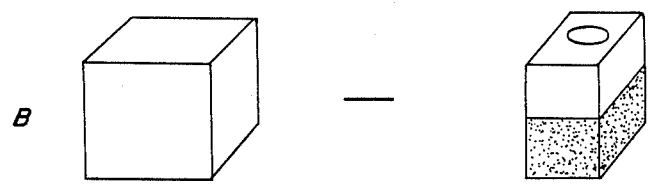
B
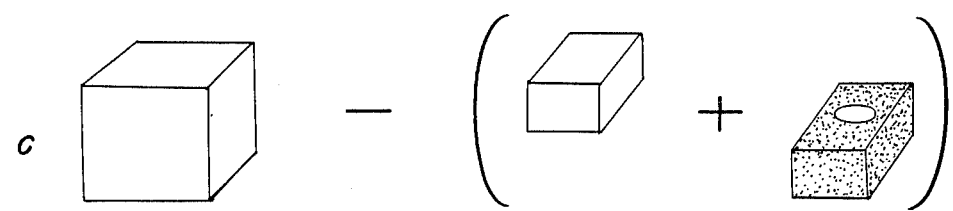
C
FIG.14c

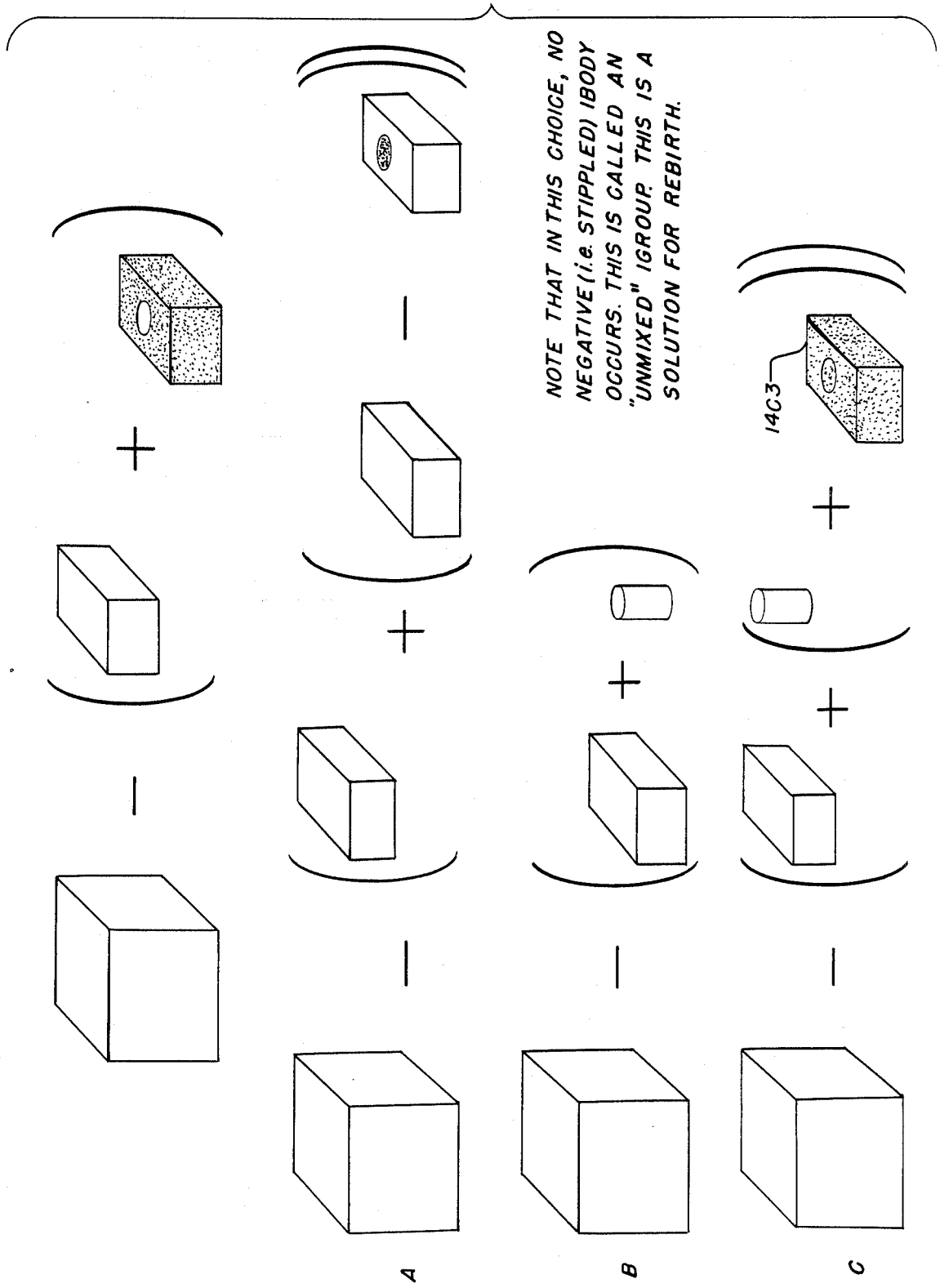

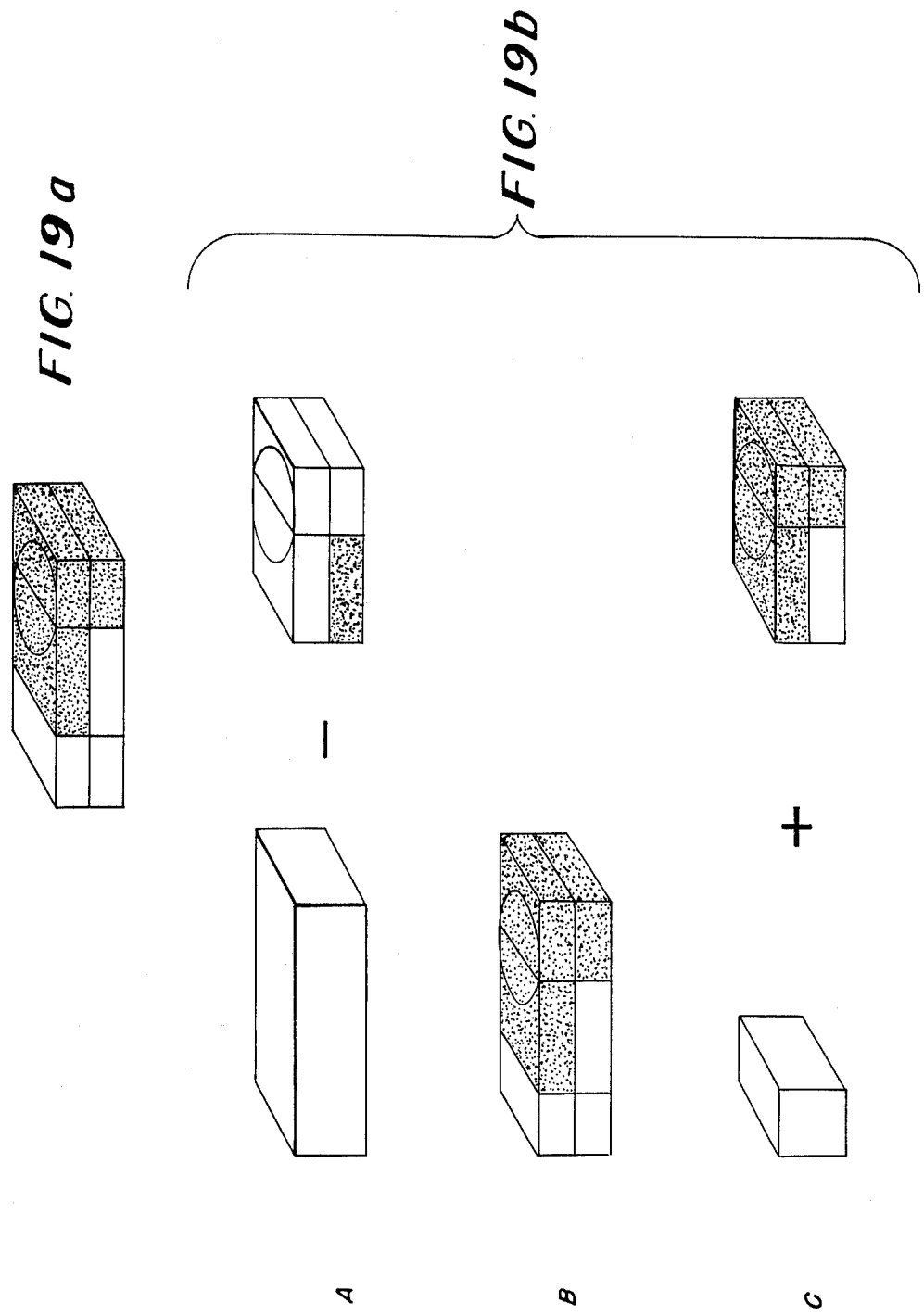

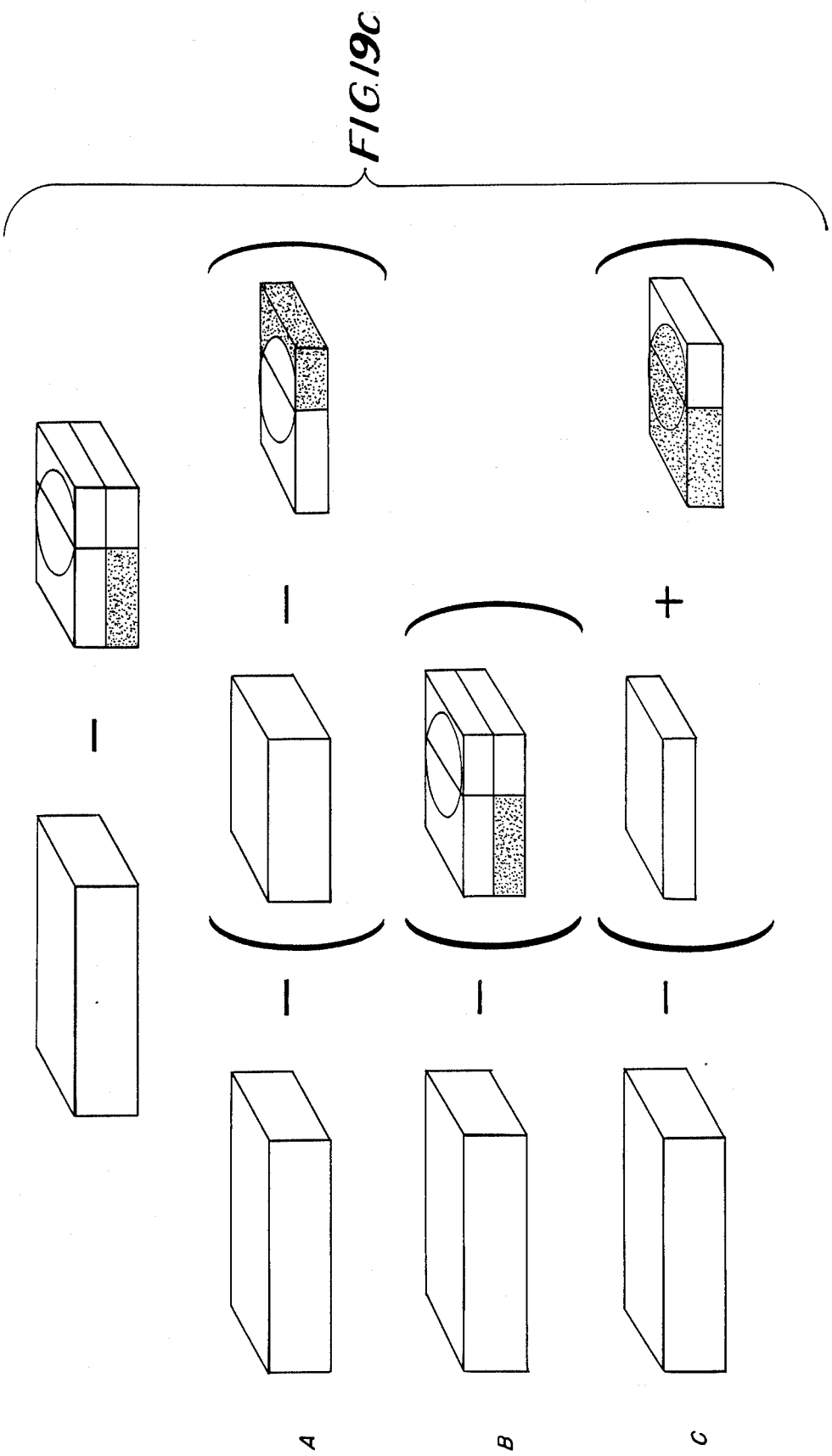

CONVERTING THE ROUNDER TO STANDARD PRIMITIVES

SYSTEM FOR CONVERSION BETWEEN THE BOUNDARY REPRESENTATION MODEL AND A CONSTRUCTIVE SOLID GEOMETRY MODEL OF AN OBJECT

The U.S. Government has rights in this invention pursuant to contract No. DE-AC04-76DP00613 between the U.S. Department of Energy and Bendix Corporation.

FIELD OF THE INVENTION

The present invention relates to a system for converting between geometric models representing an object. More specifically, the system of the present invention automatically converts from the boundary representation (B-rep) of an object to a constructive solid geometry representation (CSG) of the same object to provide an improved interface between computer aided design (CAD) and computer aided manufacture (CAM). The present invention may be used to provide bidirectional communication between design processing which identifies features and a process planner which optimizes the manufacture of these features using available construction techniques.

BACKGROUND OF THE INVENTION

In recent years, there has been an increased desire to commercially utilize computer technology in the areas of design and manufacture. With the increased capabilities of today's computers, computer aided design (CAD) and computer aided manufacture (CAM) have been commercially utilized with increasing frequency. However, comprehensive integration of computer aided design systems and computer aided manfuacture systems has been a difficult goal to achieve.

One problem associated with interfacing CAD systems and CAM systems is that different modelling approaches may be utilized by the respective systems. Boundary representation modelling is a more natural system for design work as it has explicit faces to which tolerance information may be associated. In boundary representation modelling, the surface boundaries of a solid are stored explicitly in the compute. Surface information such as hole threading and surface finish may be more easily stored as can the above mentioned tolerance information.

The constructive solid geometry model of an object is formed by combining simple shapes such as blocks and cylinders in building block fashion. These so-called primitives are combined to form a complete representation. The constructive solid geometry model of an object provides a simplified determination of the manner in which to construct the object. Thus, it is beneficial to generate a constructive solid geometry model to interface with a process planner, and to aid developing numerical control instructions for manufacturing the object.

The conversion of the boundary representation of an object into a constructive solid geometry representation thereof enables integrated computer aided design and manufacture. Such a conversion is desirable in that it facilitates improved interfacing of existing computer aided design and computer aided manufacturing systems, and more completely automates the design-manufacture process.

DEFINITIONS

The following terms utilized in the explanation of the present invention are defined for the convenience and understanding of the reader. The defninitions provided are for the convenience of the reader only and are not intended to limit the scope of the present application.

Boundary representation (B-rep): The modelling representation of an object by the description of the surfaces, edges, and vertices thereof. B-rep modelling utilizes elemental surfaces such as planes and right circular cylinders.

Constructive Half-space Geometry representation (CHG): The representation of an object by Boolean combinations of half-spaces. The primitives used in this representation are half-spaces which may be unbounded.

Constructive Solid Geometry representation (CSG): The representation of an object by Boolean combinations of solid primitives necessary to construct the object. For example, common primitives in this representation are blocks, spheres, and right-circular cylinders. Manufacturing operations, in CSG models are represented by unioning, intersecting, and differencing. Combinations of these operations are used to construct the constructive solid geometry representation.

Sectioning host surface: An infinite plane or other elemental surface containing a B-rep face and intersecting the interior of said object (see FIG. 11).

Half-space: A region of space defined by one side of an elemental surface such as a plane, cylinder, or sphere.

I-body: A region of space defined by a set of intersecting half-spaces. An I-body is called a disjunct in Boolean Albegra, and is given a positive or negative sign. If an I-body's sign is positive, the region is solid. If the I-body's sign is negative, the region is void.

I-Group: A set of non-overlapping I-bodies, the union of which is also an I-body.

Mixed-I-Group: An I-group containing both positive and negative I-bodies.

Numeric domain: The domain where elements are defined quantitiatively and numerically. This is the normal domain for programming languages such as FORTRAN.

Possibility: An intermediate constructive solid geometry representation of an object developed from the boundary representation thereof. Possibilities are evaluated heuristically in successive recursions to determine an optimal constructive solid geometry representation of the object.

Primitive: An elemental building block in a particular representational system.

Grazing host surface: an infinite plane or other elemental surface containing a face of the B-rep of the object while not intersecting the interior of the object (see FIG. 10).

Stock: A finite primitive within which the CSG solution or model must be contained (See FIG. 17).

Symbolic domain: A domain in which elements are defined with symbolic names. This is the normal operating domain of aritifical intelligence programming languages such as LISP.

OBJECTS OF THE INVENTION

It is an object of the present invention to convert from the boundary representation of an object to the constructive solid geometry representation thereof.

It is another object of the present invention to improve the interfaceability of computer aided design and computer manufacture sstems by converting from the boundary representation of an object to the constructive solid geometry representation thereof.

It is another object of the present invention to convert from the boundary representation of an object to a particular constructive solid geometry representation thereof best adapted for use in a given manufacturing environment.

It is still another object of the present invention to convert from the boundary representation of an object to a constructive solid geometry representation thereof heuristically determined to be best adapted to a selected manufacturing process.

It is a further object of the present invention to utilize artificial intelligence techniques in the conversion of the boundary representation of the object into a constructive solid geometry representation thereof.

It is a still further object of the present invention to convert from the boundary representation of an object into a constructive solid geometry representation thereof while retaining surface finish, thread, and other machining and manufacturing related information in the constructive solid geometry model of the object.

SUMMARY OF THE INVENTION

These objects of the invention are accomplished with applicants' system for converting the boundary representation of an object into a constructive solid geometry representation thereof. The method of the present application includes three primary parts. Firstly, the boundary representation of the object is cleaved into elemental atomic geometrical units or I-bodies. Each of the elemental atomic geometrical units or I-bodies may be a primitive such as a block, cylinder, or a sphere or a regularized intersection of such primitives. The method of the present invention next represents each I-body cleaved from the boundary representation of the object in symbolic form. Each symbolically represented I-body has associated therewith a map relating it to all I-bodies directly adjacent thereto. Finally, the method of the present invention assembles the elemental I-bodies into assemblies which may themselves be further assembled into geometrical forms or primitives. The method of the present invention recursively assmebles the I-bodies and heuristically determines the best solution from a number of possible solutions selected. The I-bodies may be assembled into larger I-bodies by addition or subtraction to form a constructive solid geometry representation of the object.

Surface information and other relevant data contained within the boundary representation of the object may be accessed by tracing this information back via mapping techniques to the boundary representation of the object. Thus, the system of the present invention provides an information-preserving bi-directional link betwen boundary representation modelling and constructive solid geometry modelling.

The boundary representation of the object is first sectioned by each sectioning surface to produce a plurality of elemental I-bodies. The stock is used as an enclosing I-body from which the host object is subtracted to determine material to be removed. All elemental I-bodies in the original B-rep are treated as positive material while all I-bodies within the material to be removed are treated as negative material. The B-rep of the object is therefore cleaved into elemental I-bodies which are subsequently symbolically represented and mapped to define the interrelationships therebetween.

Assembly of the elemental I-bodies is then begun. From the enclosing I-body initially defined by the stock, possibilities are considered and selected so as to reduce the objects representation into a heuristically determined "best" constructive solid geometry representation of the object. Thus, the B-rep of an object may be converted into the constructive solid geometry representation of the object heuristically determined "best" by system programming. The system of the present invention allows the user to select the criteria which determines which CSG representation of the object is "best". A map is retained from the symbolic representation to the object's boundary representation and thus the obtained CSG representation of the object may be mapped back to the boundary representation. Therefore surface finish, tolerance, and other manufacturing data may be easily accessed.

The CSG representation developed by the present invention may be then provided to a regenerative process planning system which optimizes manufacture of the object by considering machine efficiencies and techniques and producing the best manufacturing plan from the object's features identified according to the teachings of the present invention. The machining steps selected by the process planner may then be supplied to a numerical control analysis system for the development of numerical control machine instructions to produce the object to be manufactured in accordance with the optimized process plan.

BRIEF DESCRIPTION OF THE DRAWINGS

The present invention and the objects thereof will be more readily understood from the detailed description set forth hereinbelow and the accompanying drawings, in which:

FIGS. 14a–14d illustrates the conversion of the object of Example 1, after sectioning into elemental I-bodies, into the "best" constructive solid geometry representation thereof;

FIGS. 19a–19f illustrate the conversion of the object of Example 2, already divided into elemental I-bodies, into the "best" constructive solid geometry representation thereof.

DETAILED DESCRIPTION OF THE PREFERRED EMBODIMENTS

Figure 1A:
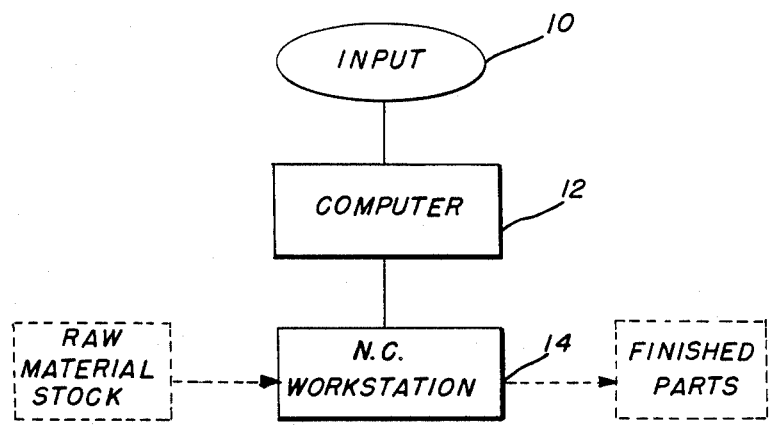
FIG. 1(a) is a simplified schematic of the hardware and material which might be utilized in an integrated computer aided design—computer manufacture (CAD-CAM) system including the present invention.
Figure 1B:
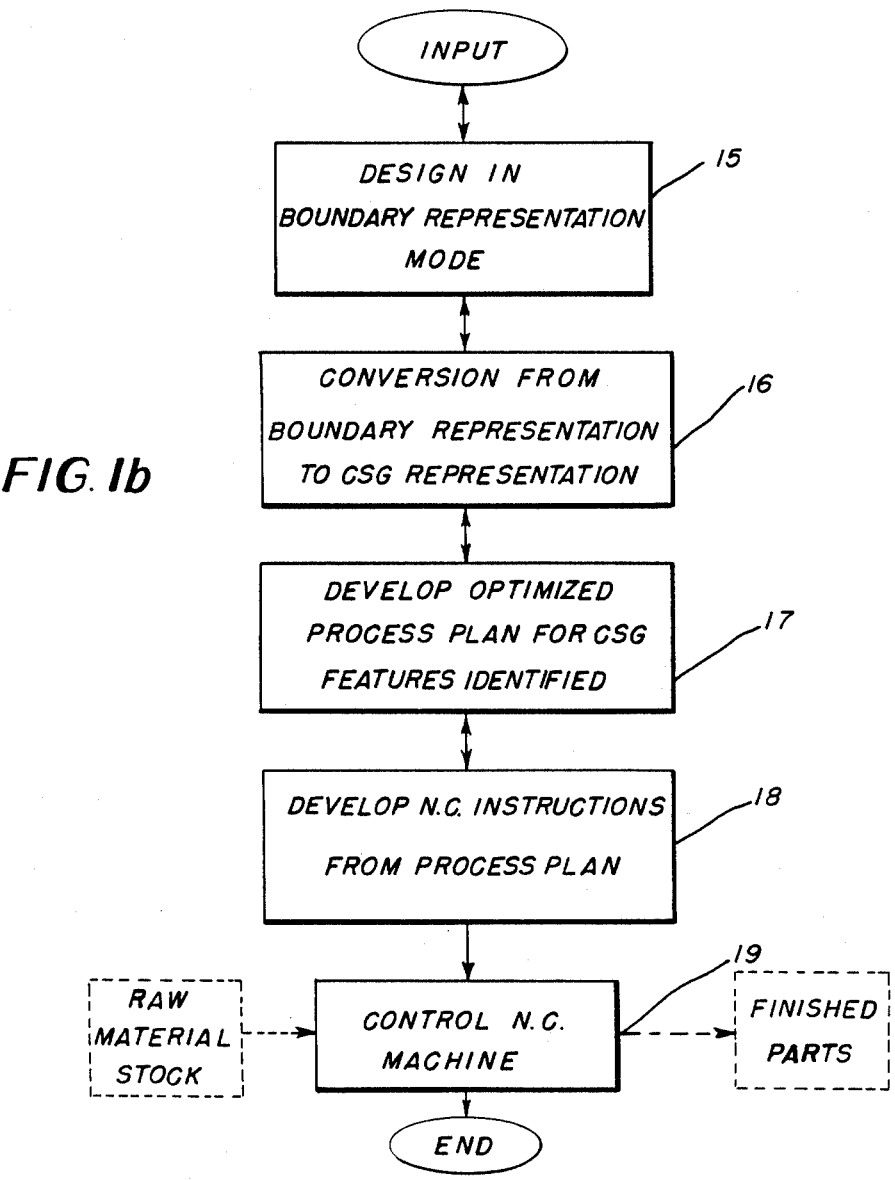
FIG. 1(b) is a block diagram of the assembly of the various processing systems which would form such an integrated CAD-CAM system.

The system of the present invention could be used to convert from the boundary representation of an object to a constructive solid geometry representation in an integrated computer aided design—computer aided manufacture (CAD-CAM) system as shown in FIGS. 1(a), 1(b). FIG. 1(a) shows the hardware and material which might be utilized in such a system. FIG. 1(b) shows the various processing systems which might be used in such an integrated CAD-CAM system. While only a single computer 12 is shown in the embodiment of FIG. 1(a) for simplicity, a separate computer might be utilized for each of the process steps of FIG. 1(b).

Information is introduced to the CAD-CAM system via input 10 to facilitate the design of an object by a computer aided design or computer aided drafting system resulting in the development of the boundary representation of the object which is desired to be manufactured. This design of the object and development of its boundary representation mode is illustrated in step 15 of FIG. 1(b).

The boundary representation is then converted into a constructive solid geometry representation by the system of the present invention in step 16. The system of the present invention is more fully illustrated and described in FIGS. 2–9 and the following text. The CSG representation thus produced identifies manufacturing features and may be used by a process planner to develop an optimized process plan for manufacturing the object by using available manufacture processes as illustrated in step 17. Such a process planner could be, for example, GARI developed by Yannick Descotte and Jean-Claude Latombe of I.M.A.G., B.P. 53X-38041, Grinbole Cedex, France, or TOM developed by K. Matsushima, N. Okada and T. Sada at the University of Tokyo.

Such a process planner identifies process steps (e.g. milling a pocket, drilling a hole) which may be performed, and their particular order necessary to form the part in an optimal manner. This information is then provided to a machine tool numerical control (NC) analysis program which will determine feedrates, and develop machine commands to drive one or more particular machines to form the object as illustrated in Step 18. This NC analysis program converts the process plan into machine instructions to form the desired part. These instructions are then used by a NC controller to control a desired machine 14 to perform the necessary operations or the stock to construct the object as shown in step 19. Thus, it can be seen that the system of the present invention is an important element of such an integrated computer aided design and manufacture system.

Figure 2:
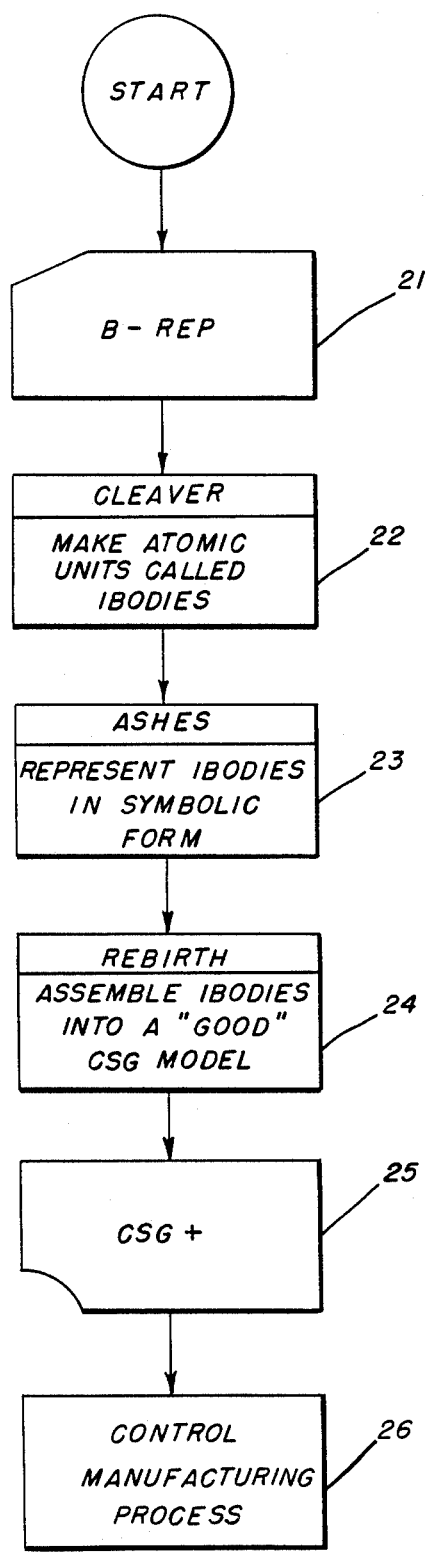
FIG. 2 is a flow chart interrelating the sub-systems used in the present invention.

FIG. 2 is a high-level flow-chart schematicaly illustrating the concepts of the present application. the process of the present invention is started by introducing the boundary representation of an object as shown in element 21 of FIG. 2. This boundary representation of an object may be received from a computer aided design or computer aided drafting system such as those known in the art. An example of such a system would be Romulus, a product of Evans & Sutherland Computer Corporation, 580 Arapeen Dr., Salt Lake City, Utah 84010.

The system of the present invention converts from the boundary represntation as shown in block 21 of FIG. 2 to a constructive solid geometry representation as shown in block 25 of FIG. 2 and includes three basic sub-systems. Firstly, a sub-system krown as CLEAVER creates elemental I-bodies from the boundary representation of the object. The CLEAVER sub-system is described in detail with reference to FIG. 3 of the present application. The ASHES sub-system then represents these I-bodies in symbolic form to enable the reconstruction of the information described in the boundary representation of the object using artificial intelligence techniques. The ASHES sub-system will be described in greater detail hereinbelow.

Lastly, the REBIRTH sub-system assembles the I-bodies produced by the CLEAVER sub-system and represented in symbolic form by the ASHES sub-system into a constructive solid geometry model of the object of interest which may then be utilized by a process planner for interface with a desired manufacturing process to construct the object. The REBIRTH sub-system, element 24 of FIG. 2, is described in greater detail with reference to FIG. 4 of the present application. The CLEAVER, ASHES, and REBIRTH sub-systems of the present application collectively produce the constructive solid geometry representation identifying features best adapted to the manufacturing processes with which its use is intended. These manufacturing processes are controlled downstream by element 26 of FIG. 2 as previously described. The derived constructive solid geometry representation, schematically indicated as element 25 of FIG. 2, is enhanced with finish information such as surface finishes, tolerance information, threading, etc. Therefore, this enhanced information is referred to as CSG+ in element 25 of FIG. 2.

The system of the present invention will now be described in detail with reference to the subroutines of FIGS. 3–9. The system will be further described with reference to Examples 1 and 2 using the illustrations of FIGS. 10–19. It should be noted that, in the preferred embodiment, the system of the present invention was operated on a Control Data Corporation Cyber 174 using the NOS 1.4 operating system.

The CLEAVER sub-system

The CLEAVER system functions to create elemental I-bodies which can be later used by the REBIRTH sub-system to create a "good" constructive solid geometry representation of the object being modeled. The CLEAVER sub-system works in the numeric domain of the boundary representation of the object. The CLEAVER sub-system uses elemental surfaces containing each of the faces of the object being modeled which graze or cleave both the object and the portions of the surrounding areas into elemental I-bodies. The CLEAVER sub-system will now be explained with reference to the FIG. 3 flow chart and FIGS. 10–13.

Figure 10:
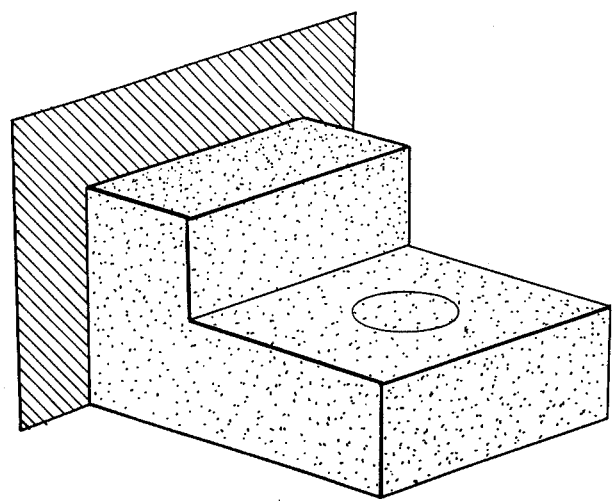
FIG. 10 illustrates a grazing surface associated with the object of Example 1.
Figure 11:
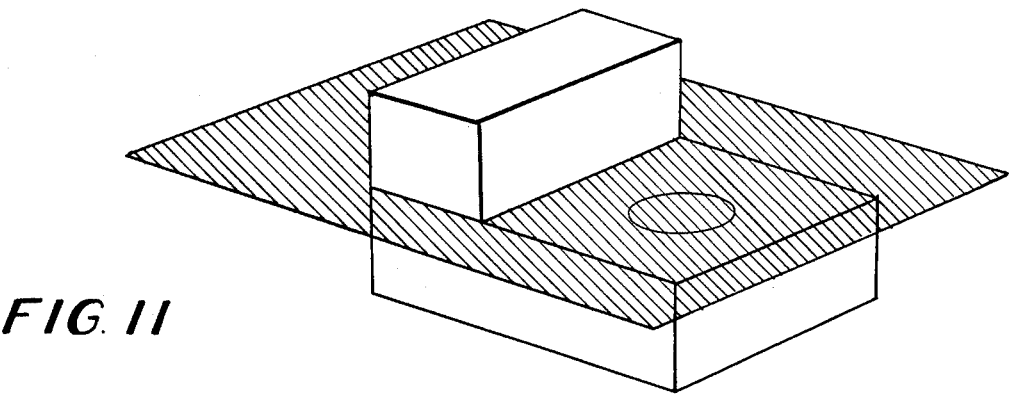
FIG. 11 illustrates a sectioning surface associated with the object of Example 1.

The first step 21 of CLEAVER is to classify each surface of the B-rep of the object as either a sectioning surface or a grazing surface. FIG. 10 of the present application illustrates an example of an object (Example 1) having a boundary representation which is to be converted into a constructive solid geometry representation of the object. The object of FIG. 10 (hereinafter referred to as the object of Example 1) includes a number of surfaces which are specified in detail by the boundary representation of the object including the location of the vertices, edges and faces of each surface of the object. In the boundary representation of the object, each surface has finish, thread, and other necessary information associated therewith. Each face of the object of Example 1 as shown in FIG. 10 can be considered to be embedded in a plane, or other elemental surface which may be infinite. These elemental surfaces are also referred to as hosts and are classified as either grazing or sectioning. The system identifies each host and develops a flag to indicate whether it is a grazing host. Thus, step 21 of the CLEAVER sub-system of FIG. 3 classifies each host as grazing or sectioning. An example of a grazing host is shown in FIG. 10. An example of a sectioning host is illustrated in FIG. 11.

Figure 12:
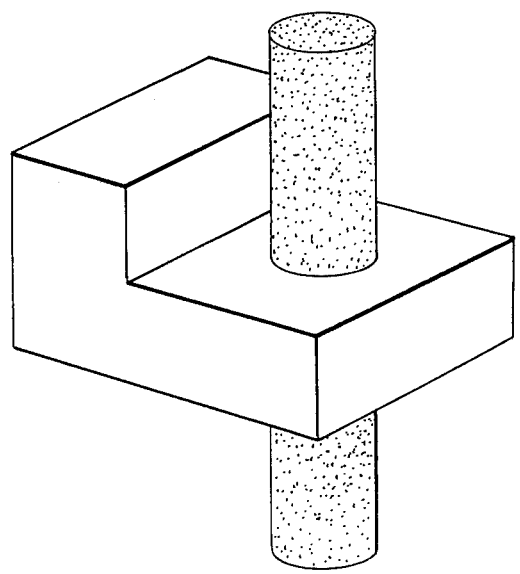
FIG. 12 illustrates a special problem in using sectioning surfaces and grazing surfaces as relating to Example 1.

A number of special cases arise during the classification of hosts as sectioning or grazing surfaces. Referring to FIG. 12, even though the cylindrical surface is in actuality a grazing host as it does not intersect any portion of the interior of the object (it does not section the object), a heuristic decision is made to classify this host as a sectioning host. The size of the cylinder is small relative to the object. Therefore, the hole can probably best be constructed by drilling. If the size of the cylinder had been large relative to the object, the system might decide that the hole was best made by casting, and thus classify the cylinder as grazing. Additionally, it is sometimes necessary to add sectioning surfaces not explicitly in the boundary representation of the object in order to resolve ambiguities or for heuristic reasons. Such an added sectioning surface will later be described with reference to the object of Example 2.

After each host surface is classified in step 21 of the CLEAVER sub-system, the CLEAVER sub-system converts each grazing host into a half-space (step 22). This step is achieved by merely specifying which side of the surface the object is on. Thus, a vector tag is associated with each grazing surface defined by step 21 of the CLEAVER sub-system.

In order to insure that the system of the present invention will operate in a practical manufacturing environment, it is necessary to insure that the intersection of the half spaces forming the object is finite. Thus, in step 23 of the CLEAVER sub-system, an Enclosing I-body is formed. This initial Enclosing I-body is referred to as the STOCK. An example of the STOCK as it relates to the object of Example 2 may be seen in FIG. 17 of the present application. The STOCK is usually selected as a box or right circular cylinder. The STOCK is generally dimensioned to correspond in size to the STOCK which will be utilized in the manufacturing process to form the object. If the object does not fit within the stock, an error flag is generated so that this problem may be rectified.

After the Enclosing I-body is defined, the object is subtracted from the Enclosing I-body in step 24 of the CLEAVER sub-system to determine the material to removed. The Enclosing I-body or STOCK is, therefore, divided into two portions, the object and the material to be removed.

Figure 3:
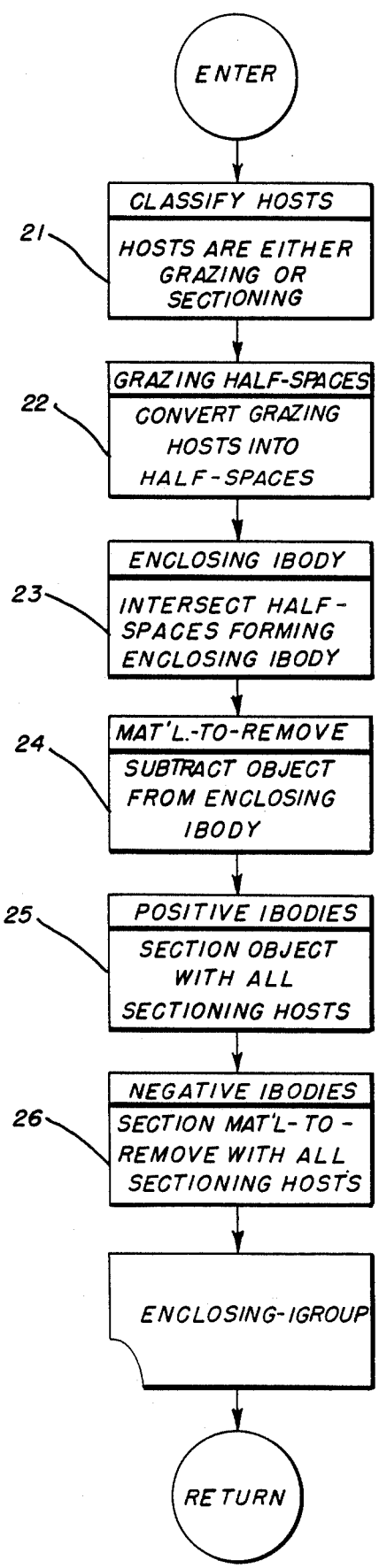
FIG. 3 is a flow chart describing the CLEAVER sub-system of the present invention.

The CLEAVER sub-system then sections the object with all sectioning hosts in step 25 of FIG. 3. This creates a plurality of I-bodies, each of which is an elemental geometrical unit or primitive such as a box, cylinder, sphere, etc. or a regularized intersection of such primitives. Each of these I-bodies taken from the object is given a positive (material) sign to indicate that it is part of the object.

Similarly, in step 26, the negative I-bodies are defined. These negative I-bodies are generated in the same way as the positive I-bodies, However, the negative I-bodies are derived from the material to be removed by the sectioning of this material with all sectioning hosts. Negative (void) signs are associated with each of the negative I-bodies to indicate that this is material to be removed from the stock.

All faces of each I-body defined in steps 25 and 26 are defined and referred to as FACELETS. All FACELETS corresponding to the faces of the original boundary representation of the object reference the finish information of the corresponding face of the boundary representation of the object. Thus, the finish information may be recovered from the boundary representation of the object by the relationship with the FACELETS of each I-body. FACELETS which define the interface between two adjacent I-bodies are given common symbolic designations so that the relative positions of the two adjacent I-bodies may be determined.

Figure 13:
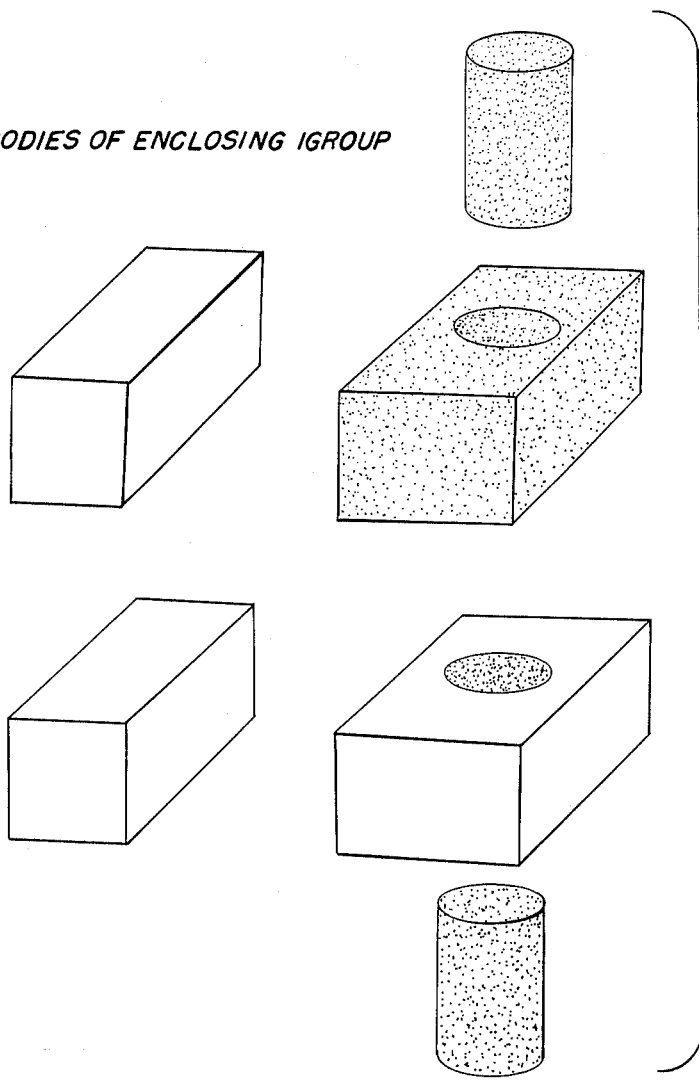
FIG. 13 illustrates the set of elemental I-bodies of the enclosing I-group with relation to Example 1.

Finally, the negative and positive I-bodies are combined in a single set to define the Enclosing I-group which is the union of all of the negative and positive I-bodies. This Enclosing I-group including its elemental I-bodies and their FACELET information is the finished product of the CLEAVER sub-system. The Enclosing I-group contains the raw data necessary to produce a constructive solid geometry representation of the object. Additionally, because each FACELET references the surface tolerance, finish, and thread information of the surfaces specified by the boundary representation of the object, the resultant constructive solid geometry representation of the object will be enhanced with this manufacturing data. The elemental I-bodies of the enclosing I-group are illustrated in FIG. 13. Note that each of these I-bodies is a primitive.

The ASHES sub-system

The ASHES sub-system functions to restructure the data defining all aspects of the Enclosing I-group as derived from the CLEAVER sub-system which is developoed in a numeric domain. The ASHES sub-system converts the boundary representation of the I- bodies into the symbolic representation need by the REBIRTH sub-system while maintaining a bidirectional path between the two. Each I-body of the enclosing I-group is redefined by the ASHES sub-system in symbolic form.

The inputs to the ASHES sub-system are the boundary representation of the original object representation, the boundary representation of each negative I-body, and the boundary representation of each positive I-body.

ASHES interrelates the numeric domain information into symbolic domain information by INFORMATION STRUCTURE DIAGRAMMING (ISD) a known mathematical technique. The ASHES sub-system allows mapping of the object tolerance and related surface information from the boundary representation to the symbolic representation used by the REBIRTH sub-system. The ASHES sub-system converts the data into symbolic form required by the program utilized in the REBIRTH sub-system. In the preferred embodiment, Lisp, a symbolic programming language is utilized in the ASHES subsyste. The preferred embodiment of the present invention utilizes UTLISP, a dialect of Lisp from the Computation Center of the University of Texas at Austin, Austin, Tex., 78712. UTLISP version 5 for the CDC 6000/Cyber 170 series machines was the version used. ASHES also utilizes IAST by Control Data Corporation in basically unaltered form. IAT is an acronym for Information Analysis Support Tool and is Product No. 60484B01 of Control Data Corporation. IAST breaks down information into atomic facts utilizable in a symbolic domain.

The ASHES sub-system first normalizes the boundary representations of the original object, negative I-bodies, and positive I-bodies. Normalization is necessary as the representation developed by Romulus allows redundant storage of data. For example, the same surface definition may be stored separately for each face of that surface. The redundancy of information is caused by the need for rapid responses during design. Further redundancy is added by the CLEAVER sub-system as a FACELET will be stored redundantly with each I-body of which it is a part. The ASHES sub-system normalizes the boundary representation data to a fifth normal record structure. Such a normalization form is well known in the field of database development and is described in *A Simple Guide to Five Normal Forms and Relational Database Theory*, by William Kent, Volume 26, No. 2, Communications of the Association for Computing Machinery, February 1983. The fifth normal record structure is developed by the IAT program. The fifth normal form is used to help eliminate data redundancies. By removing redundant information before symbolic naming, it is assured that two geometric entities are equal if and only if their symbolic names are the same.

A complication to the normalization process might be caused because two geometric entities which are intended to be identical may not be numerically identical because of finite precision calculations. This is a significant problem produced by working in the numeric domain. One must decide how similar two things must be numerically before they can be considered the same. However, this problem is reduced by the CLEAVER subsystem. Any two FACELETS must be identical or quasidisjoint (the interiors must be non-overlapping). The surfaces of each I-body must be the same as the surfaces in the original object with the exception of surfaces added for the perfomrance of the CLEAVER function.

After normalization, the ASHES sub-system gives symbolic names to the I-bodies, the FACELETS, host surfaces, and faces. The relationships between each of these elements are then reestablished using their names to form a pattern of symbolic data utilized by the REBIRTH sub-system. An I-body is redefined as a list of FACELET names and a flag to show whether it is positive material or a void. A FACELET has associated with it the name of the host surface it lies on. A host surface has associated with it a list of the names of FACELETS that lie on it, a list of the names of all I-bodies that lie "inside" it, and a list of the names of all I-bodies that lie to the "outside" of the host surface.

To provide the link from the derived constructive solid geometry representation back to the boundary representation of the object, the name of the face each FACELET was cleaved from must be associated with that FACELET. This link is especially important as the boundary representation of the object has tolerance information associated with most faces. The association between each face and its corresponding FACELETS must be determined in the numeric domain, but this problem is reduced by the CLEAVER subroutine as described above. The system may determine that a FACELET is not cleaved from a face by finding any point on the FACELET not also on the face. To provide that the FACELET is cleaved from the face, it is necessary only to show that the FACELET is the face, or to find a point on the FACELET which is also in the face.

To exemplify the operation of the ASHES sub-system, if the REBIRTH sub-system desired to know the volume of an I-group, it would request the volume of each I-body using the I-body name and add the volumes to get the volume of the assembled I-group. As each I-body is linked to the I-group with the ASHES sub-system, this information may be recovered from information assembled by the CLEAVER sub-system. Similarly, names of FACELETS may be used to map back through the ASHES sub-system to the face and the boundary representation to obtain desired tolerance information from the boundary representation of the object.

From the foregoing, it is apparent that the ASHES sub-system maps each I-group member into association with an I-group. ASHES further defines each I-body referenced by the I-group member and maps each FACELET of the I-body to the I-body. Further, each FACELET will be mapped to the face of the boundary representation of the object from which it was derived. Each FACELET is defined in terms of the host surface from which it is derived. All numeric information is thus ultimately mapped to a corresponding I-group, I-body or FACELET. Thus, the ASHES subroutine develops a normalized mapping from the numeric domain to the symbolic domain. This information may be utilized by the REBIRTH sub-system of the present invention.

The REBIRTH sub-system

The REBIRTH sub-system utilizes the symbolic representations of I-bodies produced by ASHES to derive the "best" constructive solid geometry representation of an object to be manufactured. The operation of REBIRTH is made possible by the CLEAVER sub-system which restricts the search universe to a finite set of I-bodies for both the object to be manufactured and the material to be removed. The ASHES sub-system changes this representation to the symbolic domain. Now, the REBIRTH sub-system utilizes this symbolic representation of the set of I-bodies defined within the STOCK.

The REBIRTH sub-system assembles the elemental I-bodies produced by the CLEAVER sub-system into a "good" constructive solid geometry representation of the object. The REBIRTH sub-system heuristically searches possible combinations of I-bodies to determine the best possible constructive geometry representation of the object, consistent with limitations inherent in the user's manufacturing environment.

Figure 4:
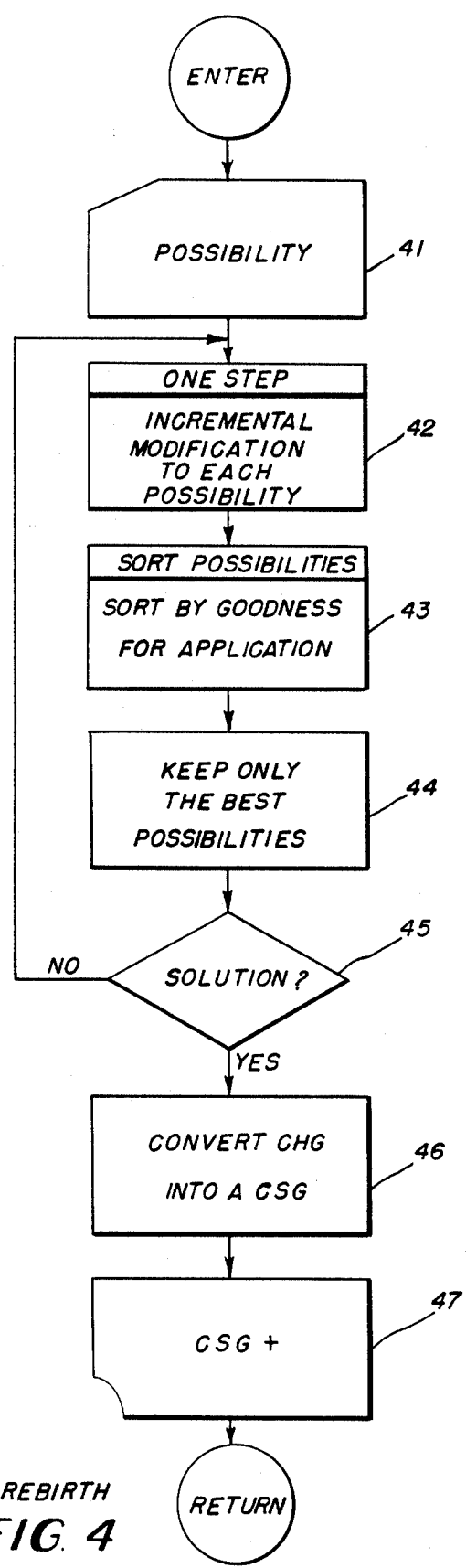
FIG. 4 is a flow chart illustrating the REBIRTH subsystem of the present invention.

FIG. 4 of the present application illustrates a high-level flow chart of the REBIRTH sub-system. A more detailed description of the ONE STEP step 42 will be described later.

The REBIRTH sub-system begins by utilizing the symbolically represented original Enclosing I-group and its constituent I-bodies as shown in FIGS. 14a for construction of the CSG model of the Example 1 object. The first step of the REBIRTH sub-system is the generation of simple constructive geometry possibilities by the ONE STEP step 42. In the preferred embodiment, the ONE STEP step splits the possibility into three additional possibilities which are independently evaluated. For example, in Example 1 of FIG. 14a, the possibilities A, B, and C are developed. These possibilities are then sorted by goodness for application in step 43. This determination of the relative "goodness" of each choice is determined by heuristic criteria which may be modified to suit a particular user's manufacturing capabilities. It is generally assumed that it is desirable to utilize the smallest number of manufacturing operations. Also, it is generally assumed that it is better to remove small volumes rather than to add material, and that planar and cylindrical surfaces are preferable for machining. Each particular manufacturing process operation would have a number of additional heuristic criteria utilizable in determining which possibility is "best".

After the possibilities are sorted in step 43, only the best possibilities are retained. These best possibilities are then tested to see if a complete solution is obtained in step 45 of the process. Usually, step 44 of the process retains two possiblities. The number of possibilities kept is the width of the search. Increasing the number of possiblities kept creates increasing complications in the program.

Step 45 determines if a solution is obtained by determining if the I-group representing the possibility is pure, in other words all positive I-bodies or all negative I-bodies. This is determined when each element of the solution is a pure constructive half space geometry or elemental I-body or I-group. If no solution is obtained, the REBIRTH sub-system returns to the ONE STEP step 42 and recursively develops additional posibilities, sorting them and keeping only the best.

Once a solution has been detected in step 45, the constructive half space geometry representation of the solution is converted into a constructive solid geometry representation thereof. This portion of the program utilizes some intelligence to minimize the number of bounded primitives needed to replace the half spaces. The special case of Example 2, as illustrated in FIGS. 15–19, will illustrate a complication in this conversion which will be explained with reference to these figures.

The output of step 46 is the constructive solid geometry representation of the object denoted in element 47 of this figure in CSG+. The plus sign associated with the CSG of element 47 represents the additional tolerance, surface finish, and thread data which is recallable from the constructive solid geometry representation via the map between the construction solid geometry representation and the boundary representation as produced by the ASHES program. Thus, a constructive solid geometry representation of the object initially stored in boundary representational form may be produced by the system of the present invention. This constructive solid geometry representation may then be utilized by a process planner as previously described.

ONE STEP

The ONE STEP (element 42) portion of the REBIRTH sub-system of FIG. 4 will now be described with reference to FIG. 5 of the present application. The ONE STEP subroutine takes each initial possiblity and utilizes it as starting data as shown in block 51. The ONE STEP subroutine of FIG. 5 looks for pure I-groups in step 52 and replaces any located pure positive I-group with an intersection of half spaces to produce a constructive half space geometry representation thereof. Note that the I-group includes all I-bodies within the possibility. Thus, the intersection of half spaces is developed only if there are no negative I-bodies.

In step 53, the I-group developed in step 52 is deleted if it consists of all negative I-bodies. Thus, if the possibility is all positive or all negative, it will be simplified in steps 52 and 53. In step 54, a choice set is produced from the possibility of block 51 of FIG. 5. This choice set is a set of alternative representations of the replaced I-group. FIGS. 6a–6c illustrate alternative choices which may be produced for evalutation in step 43 of the REBIRTH sub-system of FIG. 4. Each choice set is determined on the basis of nested recursive look ahead as shown in step 55 of the FIG. 5 ONE STEP subroutine. In the preferred embodiments, a nesting level of two is generally utilized to balance accuracy of results with time consumed in the conversion. Such look ahead nesting is well known in the art of artificial intelligence and described in a book entitled *Artificial Intelligence* by Patrick Winston, Reading, Mass. 01867, published by Addison-Wesley Publishing Company, 1977. When a set of choices is produced by ONE STEP using the choice set subroutines of FIGS. 6a–6c, including nested look ahead, a set of modified possibilities is produced. These modified possibilities are schematically represented in FIG. 5 as element 56. These modified possibilities are evaluated by the sort possibilities step 43 of the FIG. 4 REBIRTH sub-system.

TOTAL MINUS NEGATIVES

The total minus negatives subroutines of FIG. 6a is one choice of the choice of set of step 54 of the ONE STEP subroutine. Any I-groups not purely positive and thus replaced with an intersection of half spaces and not purely negative and therefore deleted is considered a mixed I-group and is analyzed by the TOTAL MINUS NEGATIVES subroutine as well as the other subroutines of the choice set. This mixed I-group includes a plurality of I-bodies which are made part of a total set in step 62. The TOTAL MINUS NEGATIVES subroutine then finds connected subsets of negative I-bodies in the mixed I-group in step 63. These connected subsets of negative I-bodies are representative of material to be removed.

The connected negative I-bodies in the mixed I-group form a negative subset. Positive I-bodies are added to this subset in step 64 to make a complete I-group. The TOTAL MINUS NEGATIVES subroutine then tests for cycling by determining if the I-group completed in step 64 is equivalent to the I-group of step 61. If the two groups are equivalent, cycling is detected in step 65 and failure of the TOTAL MINUS NEGATIVES routine is detemined and the system returns to the FIG. 5 subroutine. If no cycling is detected, a logical expression is constructed subtracting the complete I-groups from the total set which is all the I-bodies of the mixed I-group taken as positive, making the total set purely positive. This is performed in step 66 to produce an expression indicated in step 67 which is one choice set of step 54 of FIG. 6.

Union of Positives

FIGS. 6b illustrates another choice set, the UNION OF POSITIVES choice. The UNION OF POSITIVES subroutine of FIG. 6b again starts with the mixed I-group as initial data as shown in element 161 of FIG. 6b. The UNION OF POSITIVES subroutine then finds connected subsets of positive I-bodies in the mixed I-group in step 162. Step 162 of FIG. 6b is equivalent in operation to step 63 of FIG. 6a except a connected subset of positive rather than negative I-bodies is sought. Step 163 then completes the postiive subsets with any necessary negative I-bodies to produce a complete I-group. Step 163 is basically equivalent to step 64 of FIG. 6a except negative I-bodies are added to the positive subset rather than vice versa.

The UNION OF POSITIVES subroutine tets for cycling in step 164 by determining if the completed I-group produced by step 163 is equivalent to the mixed I-group introduced as data in element 161 of FIG. 6b. This detection of cycling is similar to that of FIG. 6a and, if cycling has occurred, a failure signal is provided as shown in element 167 of FIG. 6b, and the system returns to the FIG. 5 ONE STEP subroutine.

If no cycling has occurred, an expression indicating the union of the completed I-groups produced from the mixed I-group is produced in step 165. This expression indicated at point 166 in the FIG. 6b subroutine is another choice set of step 54 of the FIG. 5 ONE STEP subroutine.

Union of Sections

Figure 5:
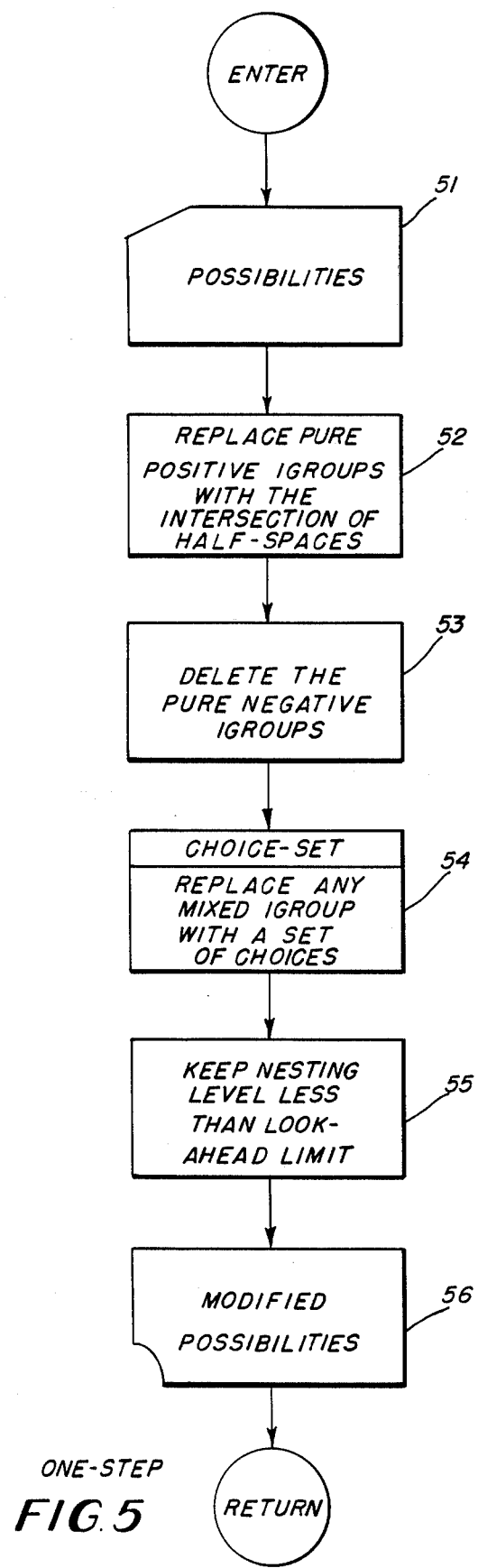
FIG. 5 is a flow chart illustrating the ONE-STEP portion of the REBIRTH system.
Figure 6A:
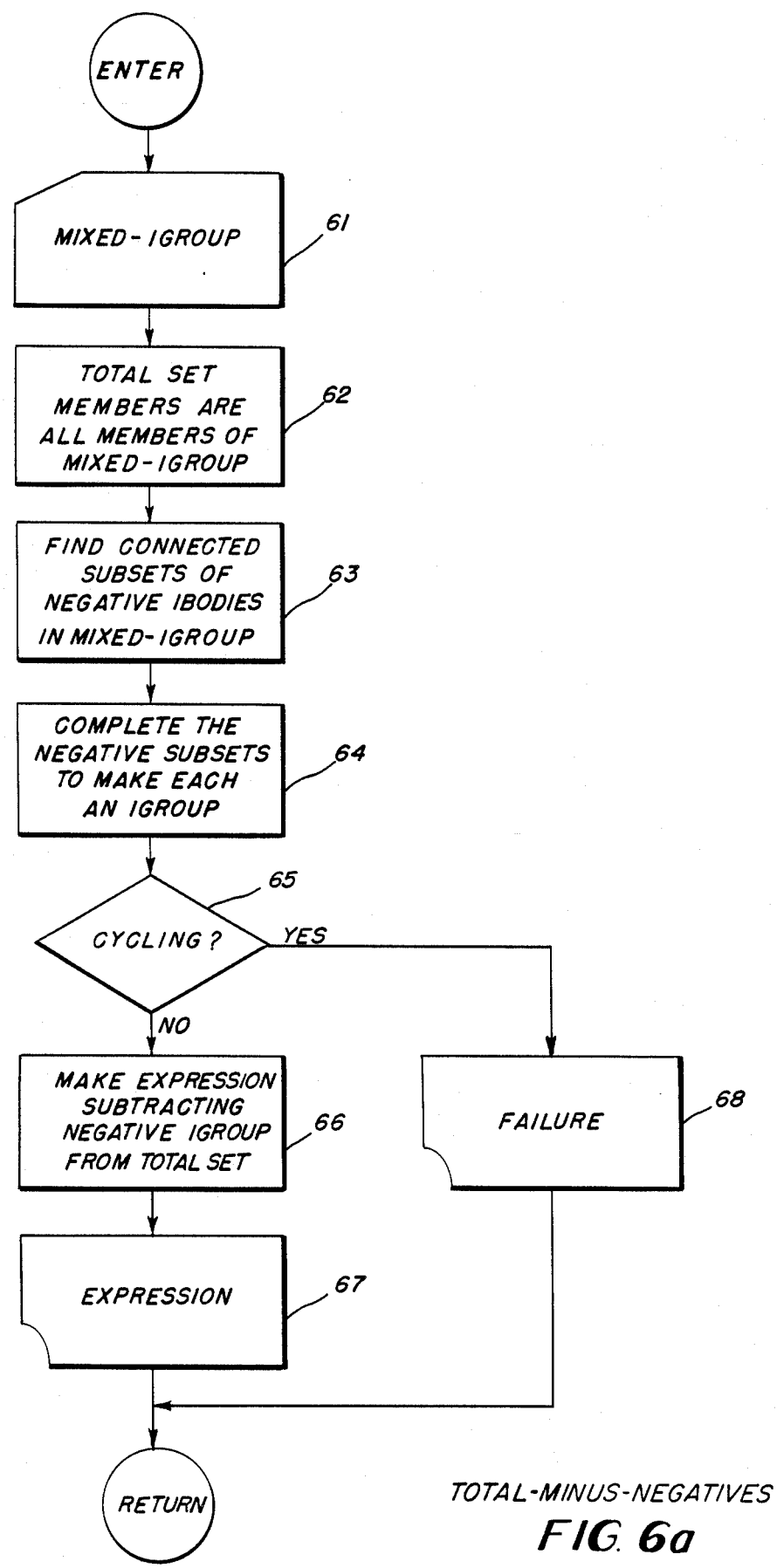
FIGS. 6a–6c are flow charts illustrating choices which are examined in parallel in the choice-step of the ONE-STEP flow chart of FIG. 5; these choices include the TOTAL MINUS NEGATIVES choice of FIG. 6a, the UNION OF POSITIVES choice of FIG. 6b, and the UNION OF SECTIONS choice of FIG. 6c.
Figure 6B:
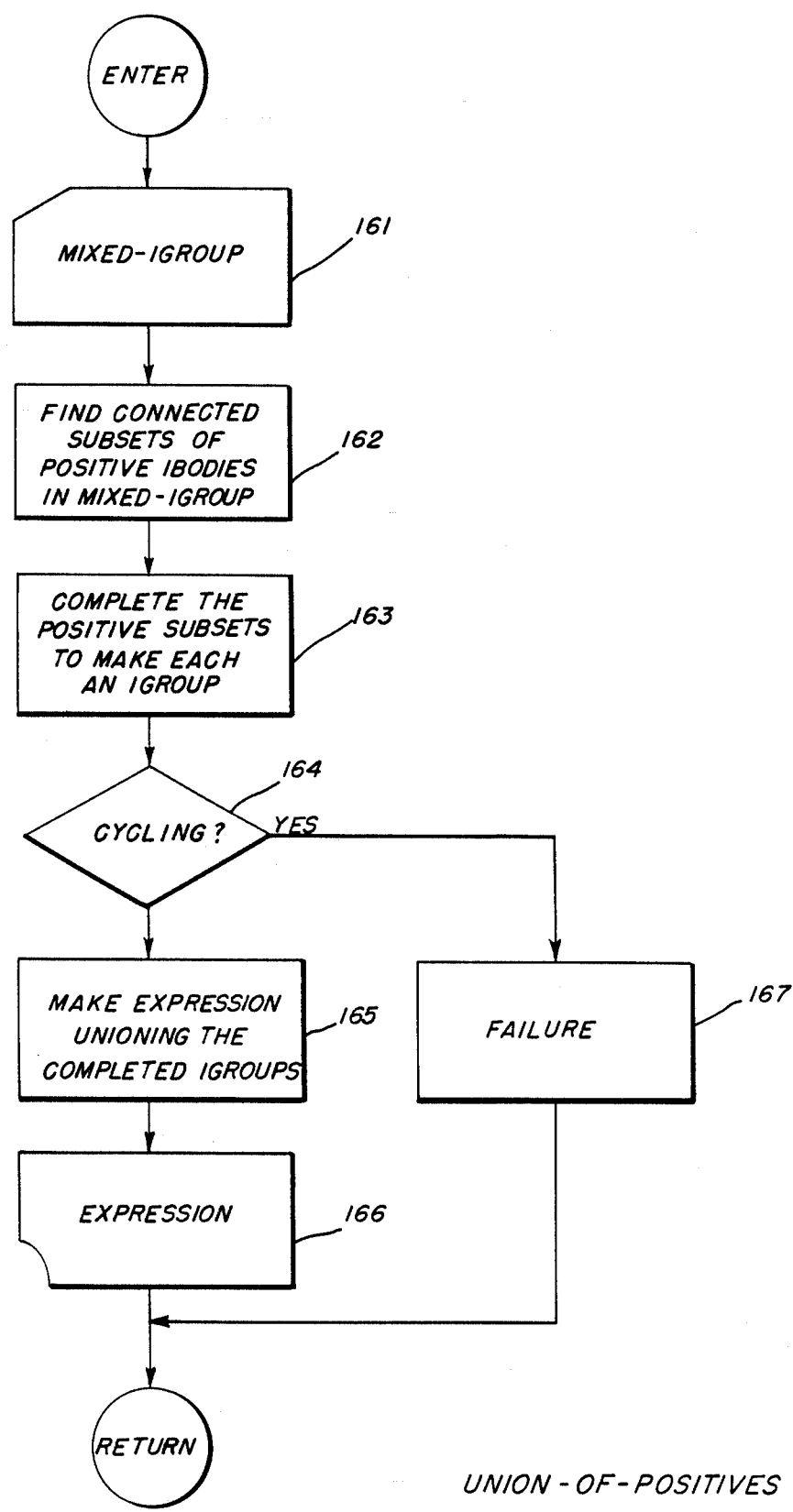
Figure 6C:
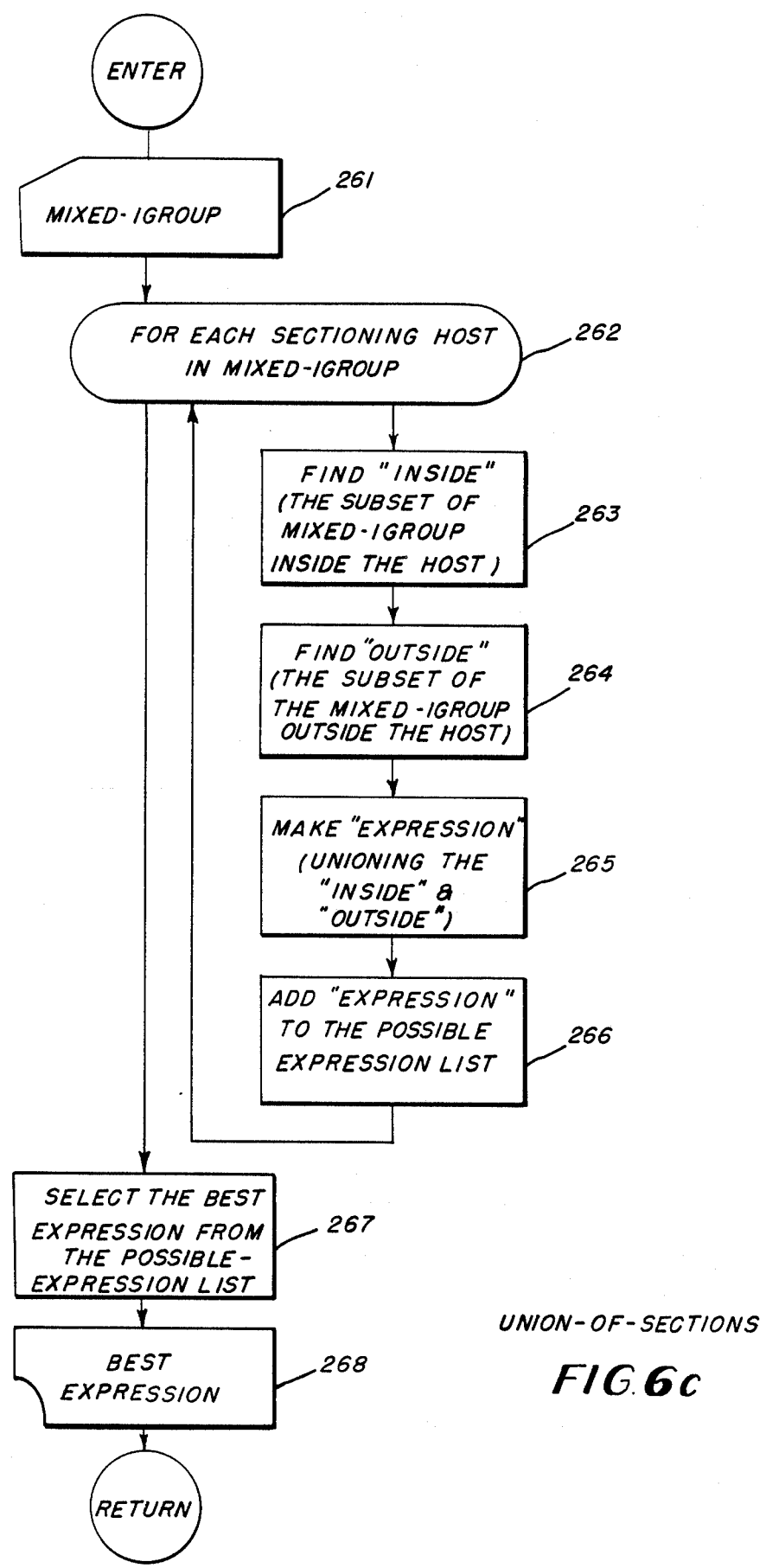

FIG. 63 illustrates the last choice set subroutine of step 54 of the FIG. 5 ONE STEP program. Again, the initial data utilized by the UNION OF SECTIONS subroutine is the mixed I-group as shown in element 261. The union of the sections subroutine performs steps 263–266 for each sectioning host in the mixed I-group as shown in element 262 of FIG. 6c.

For each sectioning host of the mixed I-group, the UNION OF SECTIONS subroutine first finds the inside of the mixed I-group in step 263 and the outside of the mixed I-group in step 264. As each sectioning host has a vector tag as explained with reference to element 22 of the FIG. 2 sub-system CLEAVER, determination of which portion of the mixed I-group is "inside" or "outside" the sectioning host is a simple matter.

The UNION OF SECTIONS subroutine then makes an expression unioning the "inside" and "outside" portions of the mixed I-group to form two additional I-groups. These "expressions" produced by step 265 are added to an expression list 266 which is complete only when an expression is associated with each sectioning host of the mixed I-group. The best expression from the possible expression list is then selected from the expression list in step 267. The best expression is determined based upon heuristic criterion. The best possible expression would be one which included all positive I-bodies on the "inside" and all negative I-bodies on the "outside" or vice versa. Alternatively, the UNION OF SECTIONS subroutine will seek to place the largest possible group of purely positive I-bodies on the "inside". Thus, a best expression as indicated in element 268 of FIG. 6c is produced. This forms one of the choices of choice set 54 of the ONE STEP subroutine of FIG. 5.

GROW

Figure 7:
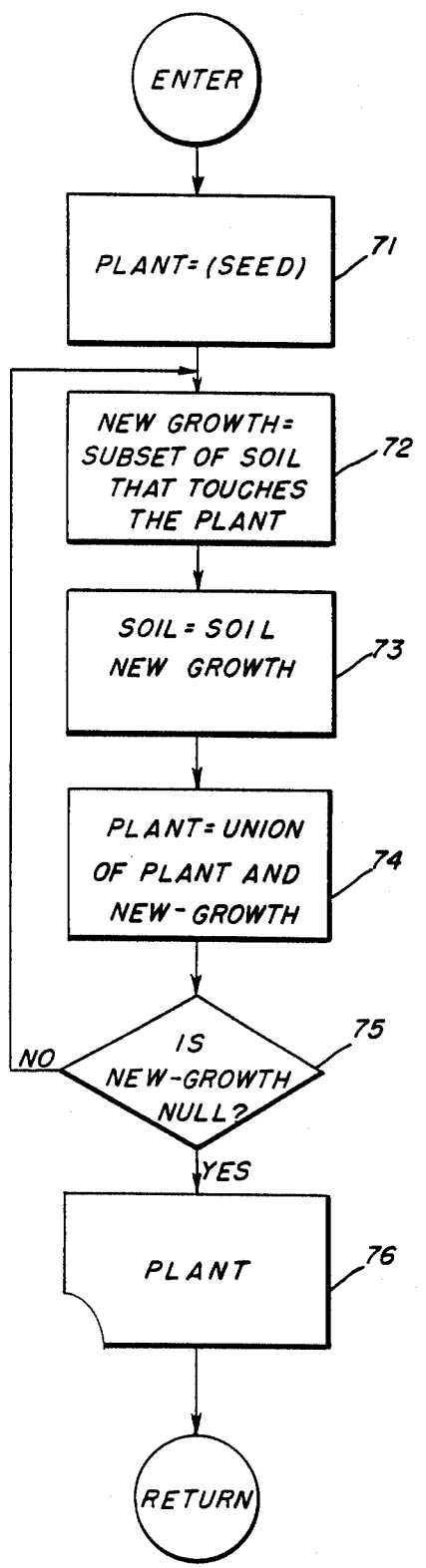
FIG. 7 illustrates the GROW subroutine utilized in the TOTAL MINUS NEGATIVES and UNION OF POSITIVES subroutines of FIGS. 6a, 6b to find connected subsets.

The GROW subroutine of FIG. 7 is utilized in step 63 of FIG. 6a and step 162 of FIG. 6b to find connected sets of I-bodies having the same sign. In FIG. 6a, GROW is utilized to find connected subsets of negative I-bodies while in FIG. 6b, GROW is used to find connected subsets of positive I-bodies. In the GROW subroutine of FIG. 7, SEED refers to any initially used single I-body while SOIL refers to the total set of available I-bodies (either all the negative I-bodies from the mixed I-group when GROW is used by TOTAL-MINUS-NEGATIVES or all the positive I-bodies from the mixed I-group when GROW is used by UNION-OF-POSITIVES). GROW is analogous to the growth of a plant and thus the data field identifiers follow the analogy. GROW starts with any I-body of the positive or negative type, depending upon whether the connected subset of negative I-bodies or positive I-bodies is desired. This SEED is placed in the set PLANT as shown in step 71. All I-bodies touching the SEED I-body are part of NEW-GROWTH as shown in step 72. NEW-GROWTH is determined by determining which FACELETS of the SEED I-body correspond to a FACELET of another I-body which is also of the same sign. Each additional I-body of the same sign having a FACELET corresponding to that of the SEED is part of NEW-GROWTH.

Once NEW-GROWTH is determined, NEW-GROWTH is subtracted from SOIL in step 73 and added to PLANT in step 74. In step 75, the GROW subroutine determines if the set NEW-GROWTH determined in step 72 is null. If the NEW-GROWTH set is null, the complete PLANT is determined and developed as an output at element 76 of FIG. 7. If the NEW-GROWTH set is not null, each exterior FACELET of the new PLANT is mapped to the FACELETS of the soil to determine if a correspondence exists and thus there is NEW-GROWTH. This iteration continues until the NEW-GROWTH set produced by step 72 is determined null by step 75, signaling that a completed PLANT has been created. This PLANT is a connected subset of negative or positive I-bodies as required in step 63 of FIG. 6a and step 162 of FIG. 6b. If all negative or positive I-bodies (depending upon which is sought) are not accounted for by PLANT, the GROW subroutine is again utilized to determine PLANT for a non-connected negative or positive I-body. This continues until each negative or positive I-body (depending upon which is sought) is accounted for as a part of a PLANT.

Completed I-group

Figure 8:
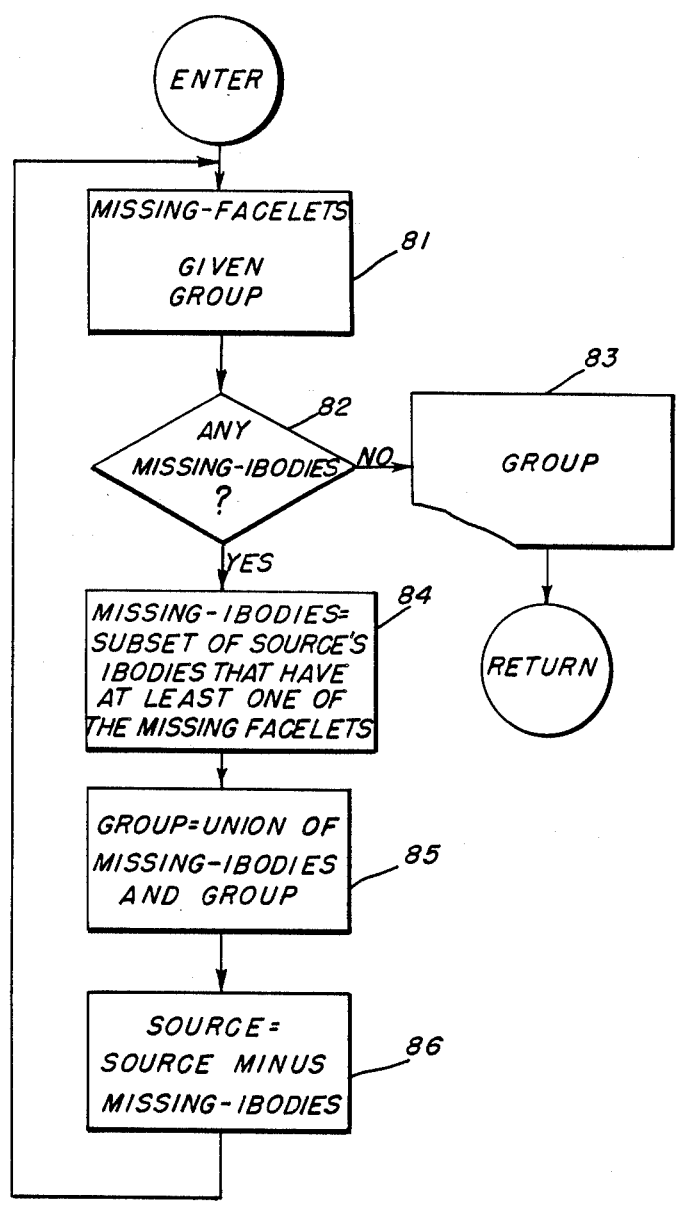
FIG. 8 illustrates the COMPLETED I-GROUP subroutine also used in the TOTAL MINUS NEGATIVES and UNION OF POSITIVES subroutines of FIGS. 6a, 6b.

The COMPLETED I-GROUP subroutine of FIG. 8 is utilized as step 64 of the FIG. 6a TOTAL MINUS NEGATIVE subroutine and step 163 of the FIG. 6b UNION OF POSITIVES subroutine. When the COMPLETED I-GROUP subroutine is used in conjunction with the TOTAL MINUS NEGATIVES subroutine of FIG. 6a, the negative subsets are completed to make an I-group, whereas the positive subsets are completed to make the I-group in the FIG. 6b UNION OF POSITIVES subroutine at step 163.

Figure 9:
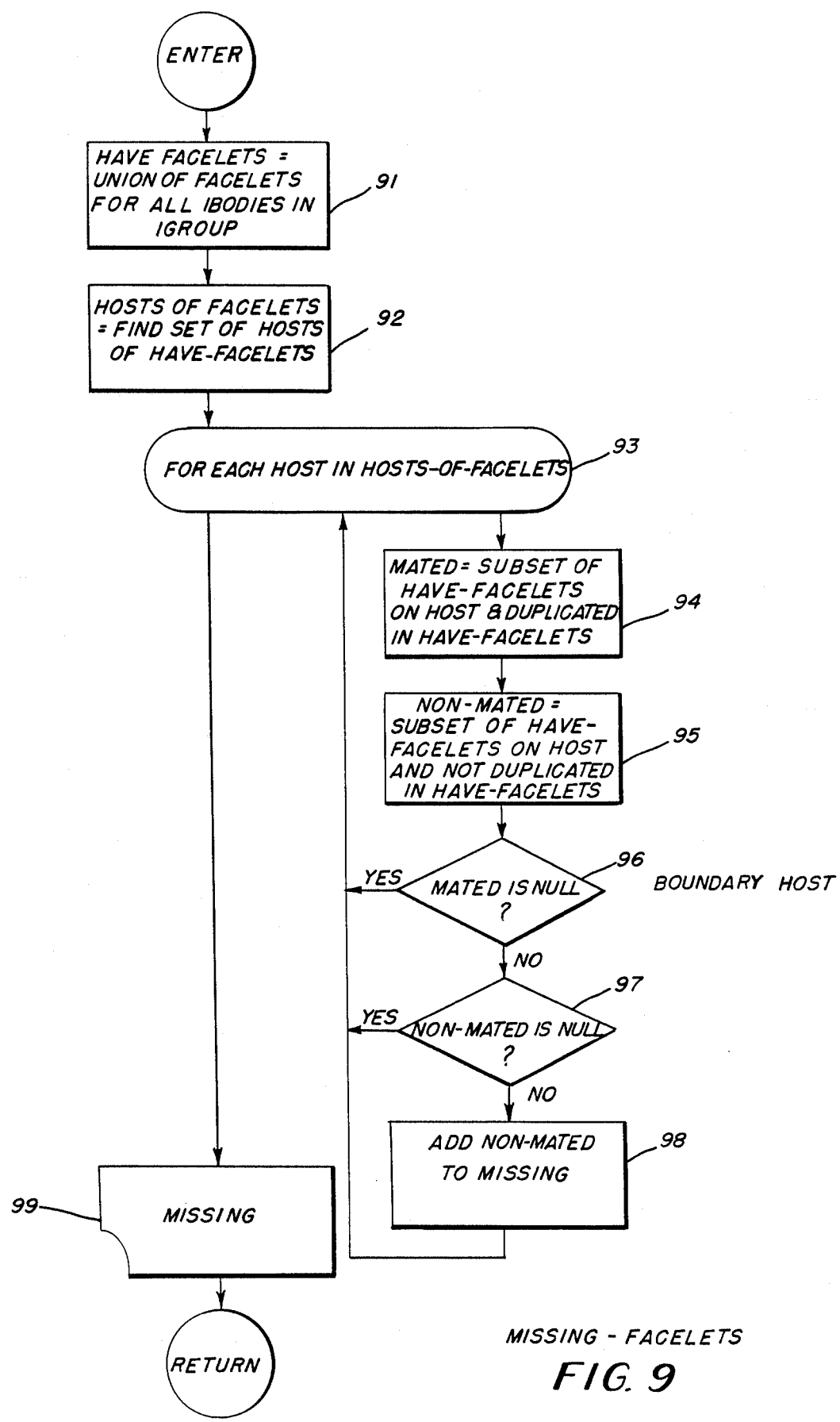
FIG. 9 illustrates the MISSING FACELETS subroutine used in the COMPLETED I-GROUP subroutine of FIG. 8.

The first step of the FIG. 8 COMPLETED I-GROUP subroutine is the determination of MISSING FACELETS in step 81. This determination of MISSING FACELETS is described in more detail with reference to FIG. 9. Referring to FIG. 9 and completing the negative subsets to make a complete I-group as necessary in step 64 of FIG. 6a, the MISSING FACELETS subroutine first produces a HAVE FACELETS set which is the union of all FACELETS for all I-bodies in the set of I-bodies defined by the GROW subroutine in step 63 of the FIG. 6a TOTAL MINUS NEGATIVES subroutine. At step 92, a HOSTS OF FACELETS set is determined. This HOSTS OF FACELETS set includes all hosts (elemental surfaces within which said FACELETS reside) of the HAVE FACELETS set. Duplicates are not allowed in the HOSTS OF FACELETS set as only unique hosts are described therein.

In step 93, each host in HOSTS OF FACELETS is analyzed according to steps 94-98 as indicated in element 93 of the FIG. 9 flow chart. For each host in HOSTS OF FACELETS, a MATED set which is the subset of HAVE FACELETS duplicated from more than one I-body is determined. This occurs in step 94. In step 95, all HAVE FACELETS on a host and not duplicated in HAVE FACELETS are made part of a NON-MATED set. At step 96, the MATED set is analyzed to see if it is null. If it is null, the host must be a boundary host as I-bodies exist on only one side of the host. This determination is made at step 96 of the MISSING FACELETS subroutine and when a boundary host is detected, the program returns to step 93 from steps 94-98. If the host is not a boundary host and thus the MATED sets are not null, the subroutine determines if the NON-MATED set is null in step 97. If the NON-MATED set is null, then there are no MISSING FACELETS. If the NON-MATED set is not null, then each FACELET contained therein is a MISSING FACELET and is added to the list of MISSING FACELETS at step 98. This process is repeated for each host of the MISSING FACELETS subroutine to determine a set of MISSING FACELETS as shown in element 99 of the FIG. 9 subroutine.

Returning to the FIG. 8 subroutine, COMPLETED I-GROUP, the MISSING FACELETS information of element 81 has been determined by the FIG. 9 subroutine. Next, the COMPLETED I-GROUP subroutine determines if there are any missing I-bodies by determining if any MISSING FACELETS exist. If there are MISSING FACELETS, then there must be missing I-bodies. Thus step 82, if there are no missing I-bodies, determines the group defined at point 83 of the FIG. 8 subroutine to be completed. Otherwise, if MISSING FACELETS and thus missing I-bodies do exist, the subroutine goes to step 84 which determines the missing I-bodies to be the subset of the SOURCE that have at least one MISSING FACELET. The SOURCE is defined as the set which is the source of I-bodies available to complete the I-group. Step 85 then updates the GROUP by adding the missing I-bodies to the GROUP in step 85. The missing I-bodies are also subtracted from the SOURCE in step 86. The completed I-group subroutine is then repeated until no missing I-bodies exist as determined by step 82. When no missing I-bodies exist, the set GROUP as shown in element 83 is determined to be complete.

The process defined above with reference to FIGS. 2-9 may be better understood by its use in converting the boundary representation to the constructive solid geometry representation of a few examples. Both Examples 1 and 2 are relatively straightforward applications of the system of the present application. However, Example 2 incorporates complications which result from the consideration of special cases.

Example 1

Example 1 is illustrated in FIGS. 10-13 to aid in the understanding of sectioning and grazing surfaces, the treatment of a cylndrical "hole" as a sectioning suface even though it is a grazing surface, and the generation of finite elemental I-bodies of the enclosing I-group of the CLEAVER program. Assuming that the elemental I-bodies of the enclosing I-group as shown in FIG. 13 have been converted into symbolic representation by the ASHES sub-system, attention is directed to FIGS. 14a-14d for the conversion of the symbolic elemental I-body representation of the object into its constructive solid geometry representation.

FIG. 14a illustrates the original enclosing I-group supplied by the CLEAVER sub-system and placed in symbolic form by the ASHES sub-system. This is the initial possibility 41 considered by the REBIRTH sub-system as illustrated in FIG. 4. This possiblity is considered by the ONE STEP subroutine of FIG. 5. As FIG. 14a does not illustrate a pure positive or pure negative I-group, then steps 52 and 53 of FIG. 5 have no effect on this example. The next step 54 is therefore to create a choice set from the possiblity.

Choice A is an example of a TOTAL MINUS NEGATIVES choice, choice B is an example of a UNION OF POSITIVES choice while choice C is an example of UNION OF SECTIONS choice. The TOTAL MINUS NEGATIVES choice simulates metal removal, the UNION OF POSITIVES choice symbolizes part assembly, while the UNION OF SECTIONS choice may reference both machining and assembly, dividing the I-group into two pieces for a decision at a later time.

With choice A, the TOTAL MINUS NEGATIVES possibility, the mixed-I-group is rerepresented as pure positive I-group minus connected sets of negative I-bodies. Because the REBIRTH sub-system works only with I-groups, the connected sets have been completed with positive I-bodies by the COMPLETED I-GROUP subroutine in FIG. 8. In this example, there is only one connected set of negatives, but in general there might be several. Note, that the shading of possiblity A indicates that the sign of the I-bodies have been reversed in relationship to the enclosing I-group of FIG. 14a in order to take into account the negative sign of the expression.

Choice B, the UNION OF POSITIVES possiblity, represents a mixed I-group as the union of the connected sets of positive I-bodies which have been completed with negatives. In this example, the UNION OF POSITIVES is not a successful choice, as it is the same as the original I-group. Thus, cycling is detected and possiblity B fails.

Choice C, the UNION OF SECTIONS possibility, represents the mixed I-group as the union of two I-groups. One I-group is those I-bodies to the right (outside) of the sectioning host illustrated in FIG. 11, while the other I-group includes those I-bodies to the left (inside) of the sectioning host. The choice of the sectioning host is a heuristic decision and in the present case could either be a vertical section or horizontal section. While the UNION OF POSITIVES and/or the TOTAL MINUS NEGATIVES possiblities may produce cycling, the UNION OF SECTIONS will always lead to two proper subsets.

For the simplicity of the present example, only a single possibility will be selected to continue the program. However, in the preferred embodiment, two possibilities are generally selected. Which possibility is determined "best" is a heuristic determination based upon the process economics or capability of the particular manufacturing facility to be used to manufacture the object. Choice A (the TOTAL MINUS NEGATIVES possibility) is chosen in step 44 of FIG. 4 as it represents material removed from the basic shape (stock). Note that each choice is determined in the preferred embodiment only after the result of that selection is determined by looking ahead several recursions. In the preferred embodiment, the look ahead limit is set at two recursions.

Choice A of FIG. 14a is then tested to determine if it is a solution. This occurs in step 45 of FIG. 4. As there remains an I-group having both positive and negative I-bodies contained therein, the solution has not been obtained. Therefore, the REBIRTh sub-system returns to step 42 of FIG. 4.

Again, the ONE STEP program of FIG. 5 utilizes the TOTAL MINUS NEGATIVES, UNION OF POSITIVES, and UNION OF SECTIONS subroutines of FIGS. 6a-6c to generate choices A-C of FIG. 14b. Again, choice A of FIG. 14b is the TOTAL MINUS NEGATIVES choice set, choice B of FIG. 14b is the UNION OF POSITIVES choice set, and choice C of FIG. 14b is the UNION OF SECTIONS choice. In this second step of Example 1's evaluation, the TOTAL MINUS NEGATIVES choice A is rejected because it involves material additions due to the double negative. Again, choice B is a deadend as cycling is detected by the FIG. 6b subroutine. Choice C looks good because sectioning creates a pure I-group that represents material removal. Therefore, choice C is chosen.

FIG. 14d takes the current I-group from the previous step as shown on the top of FIG. 14d and again goes to the ONE STEP subroutine and the subroutines of FIGS. 6a-6c to determine three possibilities. In this final step, the UNION OF POSITIVES choice is selected as a solution as a positive subset exists which is a pure I-group. This expression is selected by step 44 of the REBIRTH sub-system flow chart of FIG. 4. The REBIRTH algorithm always converges to a solution where no mixed I-groups remain. A mixed I-group is a group having both positive and negative I-bodies therein as shown in choices A or C in FIG. 14c. Note that on the next recursion, choice C would have had the pure negative I-group 14C3 eliminated and thus this also would have been a solution. However, As the UNION OF POSITIVES choice produced a solution one step earlier, this way the solution utilized. The derived constructed solid geometry representation is illustrated in choice B of FIG. 14d and is good for process planning as it represents the object as stock from which a step (the block) and a hole (the cylinder) are machined. Because the volume of the primitives corresponds to the volume of their contribution to their resulting object, inquiries can be made on the constructed solid geometry representation which improve process planning. For example, a heuristic determination to get the basic shape by ignoring all features of less than a given volume may be used to improve process planning. The constructive solid geometry representation is not a complete process plan however, as other decisions need by made. For example, should the hole or the step be machined first? How many operations should be used for each (rough, semi-finish, and finish) and can the operations overlap (rough the hole before finishing the step)? These aspects of the problem may be completed by a process planning system as previously described.

Example 2

Figure 15:
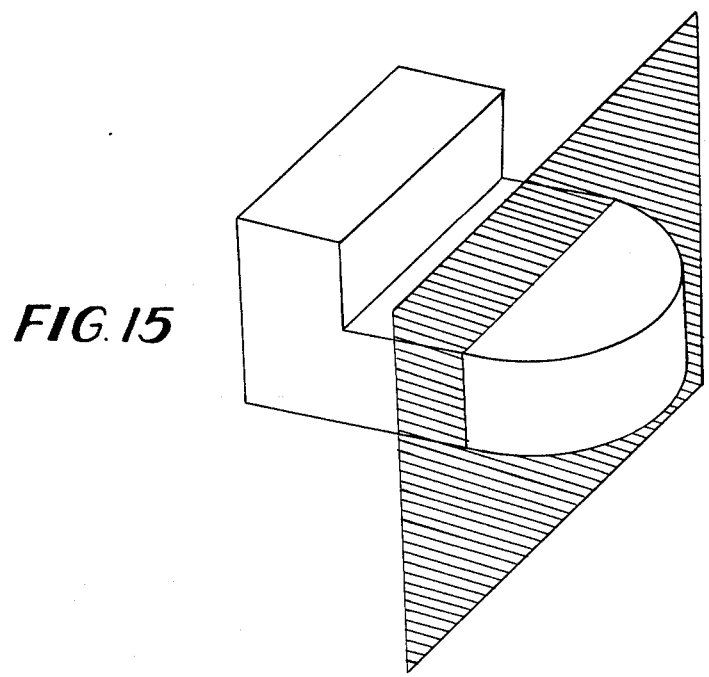
FIG. 15 illustrates a second example illustrating the complications caused by cylindrical tangency.
Figure 16:
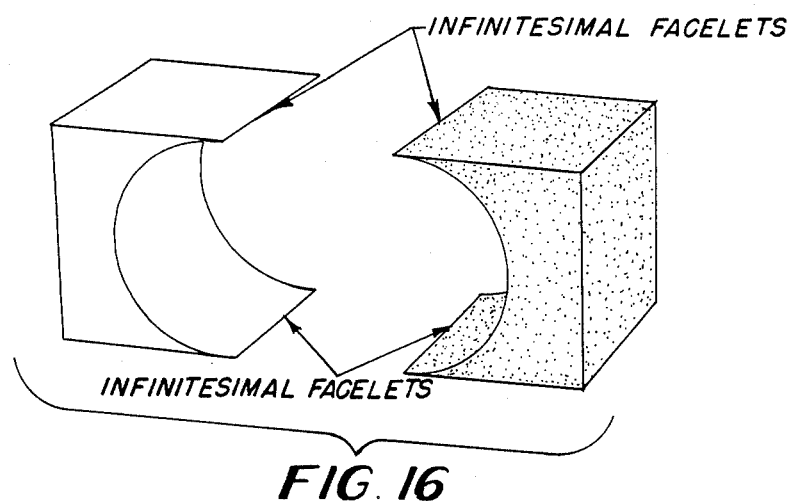
FIG. 16 illustrates the use of infinitesimal facelets used in solutions where a tangency is involved.
Figure 17:
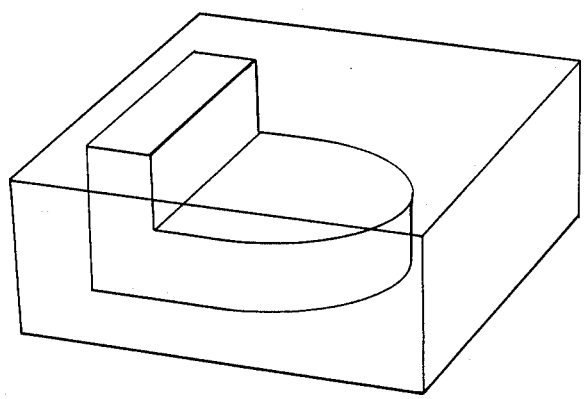
FIG. 17 illustrates the object of Example 2 defined within a stock primitive.

FIG. 15 as well as FIG. 17 illustrate a second object used as a second example to illustrate the present invention system for converting from the boundary representation of an object to the constructive solid geometry representation thereof. The object chosen for Example 2 introduces three new complications. First, an additional sectioning surface is needed to described the point of tangency between the rounded end and parallel sides of the object. This sectioning surface is illustrated in FIG. 15. The second complication is the need for a stock primitive. The third is the problem of how to deal with curved cylindrical section, known as the "rounder". Otherwise, the solution to the second example is similar to that of the first example.

The first mentioned complication, the tangency complication, is illustrated with reference to FIG. 15. The need for an additional sectioning surface is caused by the tangency of the cylindrical host with the planar host of the sides. Sectioning at the tangency points eliminates the ambiguity that would otherwise result from using only existing surfaces to define the I-bodies. In order for the I-bodies to touch at the point of tangency, ASHES will add infinitesimal FACELETS as described with reference to FIG. 16. These infinitesimal FACELETS are FACELETS of zero width at the place of tangency. These FACELETS have the area zero and the extra sectioning surface as their host. With infinitesimal FACELETS, REBIRTH does not need to treat tangency as a special case. Thus, using this fiction, the programming does not need special modification to describe such a point of tangency.

The stock primitive already described with regard to FIG. 17 is needed in the present circumstance as, otherwise, an enclosing I-body would not exist. Otherwise, there would be no grazing plane at the rounded end of the example object and thus the inner section of half spaces would not be bounded. The STOCK insures that a bounded enclosing I-body will exist. In certain circumstances, a cylinder or other axis-symmetrical object might be better STOCK.

Figure 18:
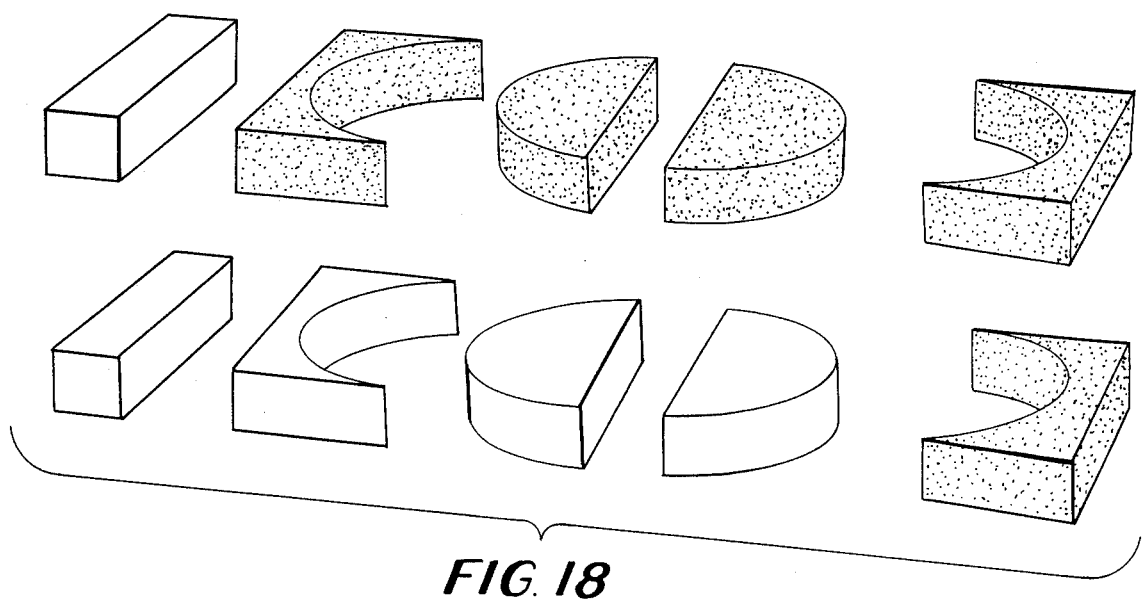
FIG. 18 illustrates the set of elemental I-bodies of the enclosing I-group with relation to Example 2.
Figure 19D:
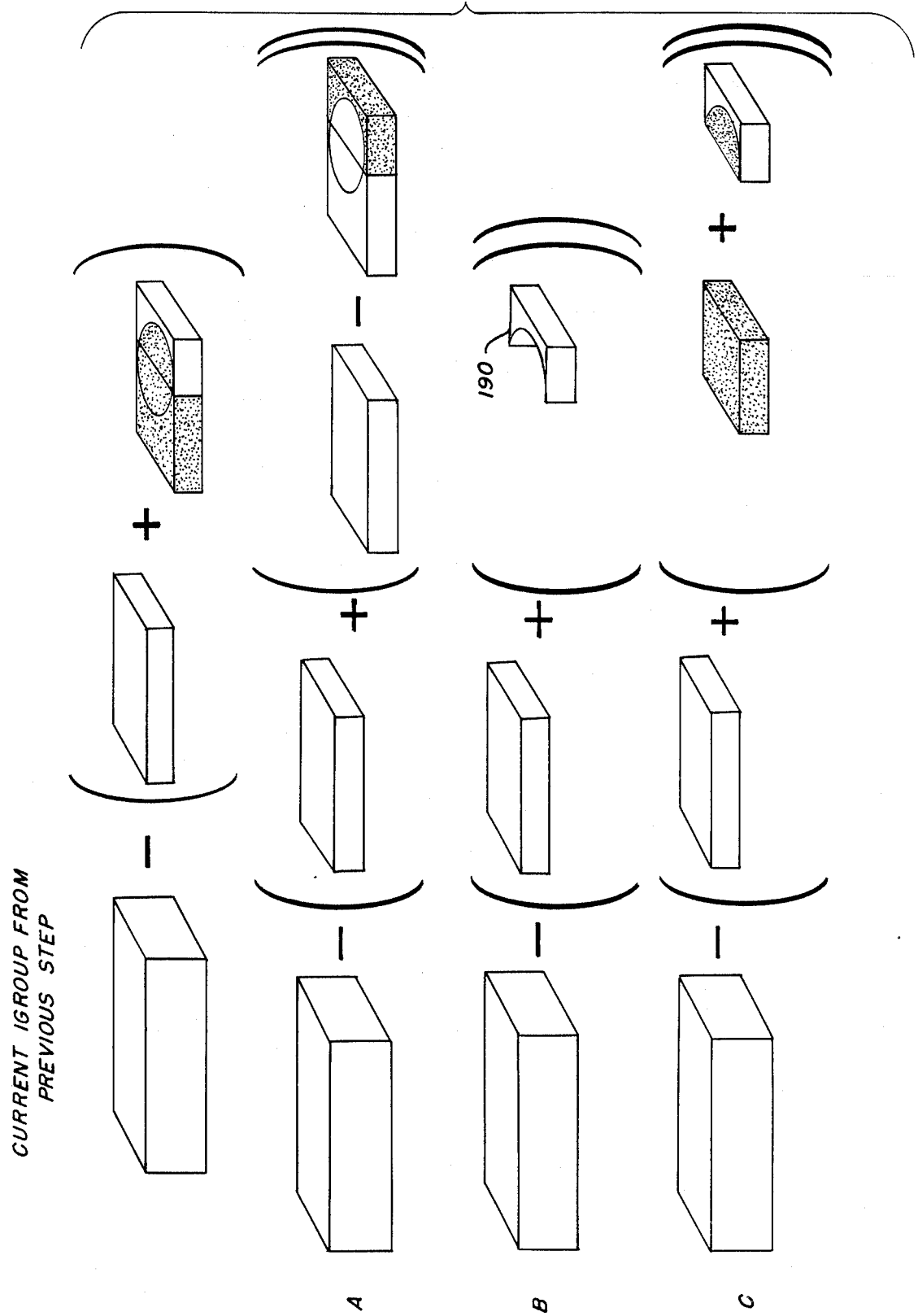

FIG. 18 illustrates an exploded view of the enclosing I-group including each elemental I-body of the object as well as the elemental I-bodies of the material to be removed within the stock. The I-bodies are made by sectioning both the material to be removed and the object with all sectioning hosts. This is the final produce of the CLEAVER sub-system. The ASHES sub-system converts this information in the symbolic domain and establishes a path back to the information in the boundary representation. FIG. 19a again illustrates the enclosing I-group including all I-bodies of the present example. Again, the ONE STEP program and its subroutines illustrated in FIGS. 6a-6c produce three choices A-C as illustrated in FIG. 19b. Again, the TOTAL MINUS NEGATIVES choice is chosen for reasons similar to those used in making a choice in Example 1.

Figures 19E, 19F:
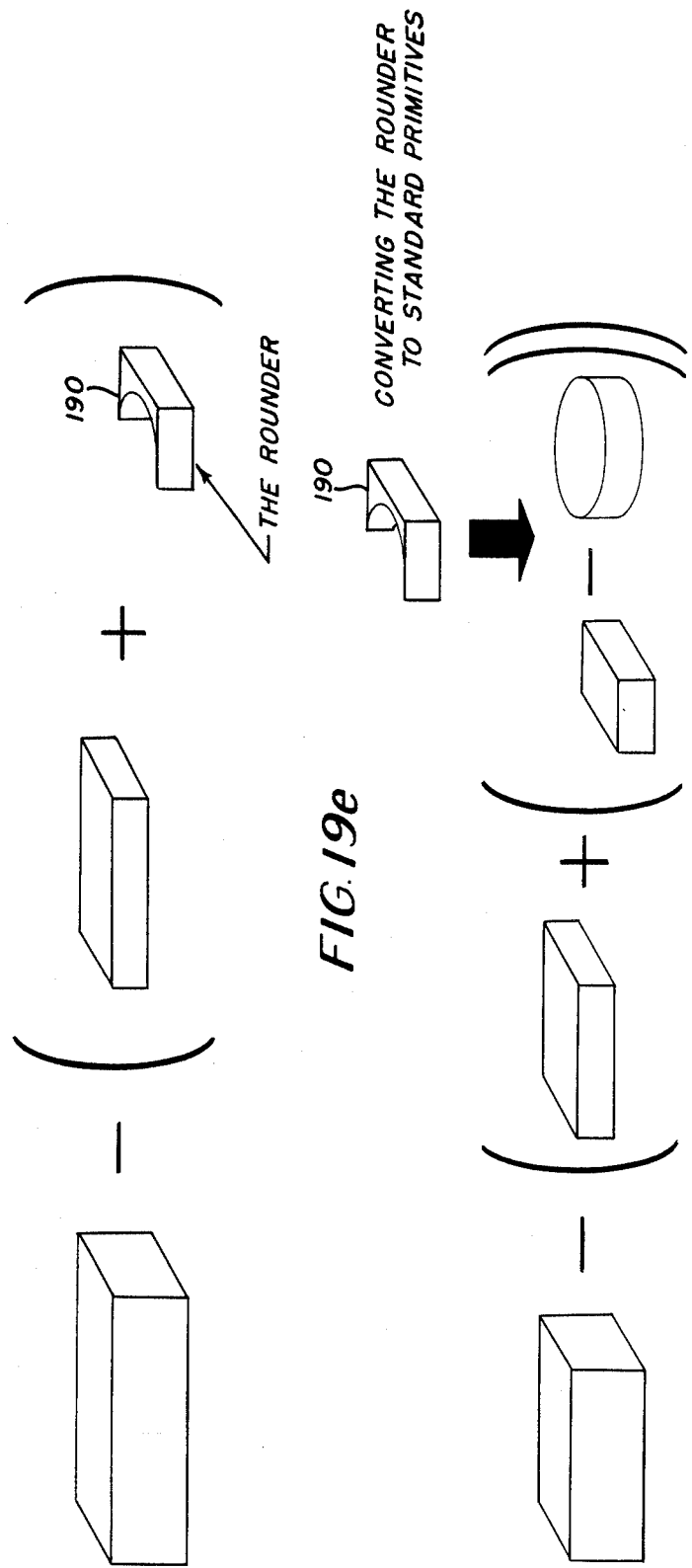

FIG. 19c illustrates the second step in the REBIRTH evaluation of the second example. The current I-group from the previous step is again used to develop three choices. Again, the UNION OF SECTIONS choice C, is chosen for the same reasons as that of the first example as shown in FIG. 14b. The final evaluation of FIG. 19c again selects the UNION OF POSITIVES step, choice B, to produce the solution illustrated in FIG. 19e. This solution includes element 190 which is termed the rounder. This I-body is not a standard primitive. The standard primitives in constructive solid geometry models are blocks, cylinders, spheres and cones. Additionally, a torus may sometimes be considered a standard primitive. Because the rounder is not a stock primitive, it requires one additional step in the process. This step is illustrated in FIG. 19f and substitutes a block minus a cylinder for the rounder in order to produce a solution involving only pure constructive solid geometry primitives. Notice that all host surfaces (including the hosts of the infinitesimal faces) may be represented by a single block and the cylinder only needs to be as tall as that block. However, simply replacing the rounder with its constructive solid geometry definition would cause problems from a process planning point of view. The rounder is the important feature, not the block and cylinder used to define it. In the present invention, the object is defined using the rounder and the definition of the rounder is used to interpret the rounder when needed. Thus, points of tangency and radiuses may be converted from the boundary representation to the constructive solid geometry representation relatively simply according to the teachings of the system of the present application.

Although the examples of the present application illustrate the use of the system of the present application to convert from the boundary representation to the CSG representation of only objects having blocks and cylinders therein, the system of the present invention may also easily accommodate other stock primitives such as cones and spheres.

The constructive solid geometry representation of the object produced by the system of the present invention, which is enhanced by the inclusion of surface finish, tolerance, thread information, and the like therewith, may be suitable used in a computer-aided manufacturing system to produce the object represented. The system of the present invention may be interfaced between a computer-aided design system which develops a boundary representation model, and a process planner as previously mentioned. Such a process planning system would determine the most economic sequence and schedule for manufacture of features of the object from the stock. As the CSG+ information provided by the system of the present invention incorporates tolerance information, etc., the process planning system receiving the output of the conversion system of the present invention will receive substantially all necessary information regarding the object to be manufactured. In face, little information about the object additional to the CSG+ representation provided by the system of the present invention, with the exception of instructions such as the type of material to be utilized in manufacturing the device would be needed by the process planner.

The system for conversion between the boundary representation of an object and a constructive solid geometry representation thereof as taught by the present application may be adapted to a number of manufacturing, design, and drafting applications. The scope of applicants' invention should not be limited by the scope of the detailed description presented herein. Instead, it will be understood that various changes and modifications would be suggested to one of ordinary skill in the art from the detailed description, and the claims attached hereto, are intended to accomplish such changes and modifications. Applicants' invention is therefore intended to be defined solely by the scope of the appended claims.

We claim:

1. A method of manufacturing an object from a boundary representation thereof comprising:
   cleaving said boundary representation of said object, which represents said object only by zero, one or two dimensional features thereof, into elemental atomic geometrical units;
   assembling said I-bodies into assemblies having atomic geometrical forms which collectively form a constructive solid geometry representation of said object usable for manufacturing thereof;
   utilizing said constructive solid geometry representation of said object to develop machine instructions for instruction one or more machines in a manufacturing process; and
   controlling said machines to perform operations under control of said instructions to manufacture at least a portion of said object.

2. The method of claim 1 further comprising the step of representing said I-bodies in symbolic form;
   said step of assembling utilizing the symbolic forms of said I-bodies.

3. The method of claim 2 wherein said step of representing comprises:
   representing each I-body as a plurality of atomic constituent facts;
   mapping said atomic constituent facts so as to interrelate said facts, said facts describing said I-body in symbolic form.

4. The method of claim 1 wherein said step of cleaving utilizes sectioning surfaces to divide said object into I-bodies.

5. The method of claim 1 wherein said step of cleaving defines said I-bodies with the intersection of half-spaces, said half-spaces being formed by:
   representing extended surfaces of said object which do not intersect a portion of the described volume of said object as grazing surfaces;
   representing all other extended surfaces of said object as sectioning surfaces;
   converting said grazing surfaces into half-spaces by providing a representation associated with each said grazing surface specifying which side of said surface said object resides;
   defining the material to remove from said enclosing body;
   sectioning said object with all intersecting said sectioning sufaces to form positive elemental atomic geometrical units (I-bodies);
   sectioning said material to be removed with all intersecting said sectioning surfaces to form negative elemental atomic geometrical units or (I-bodies).

6. The method of claim 1 further comprising:
   transferring information contained in the boundary representation of said object to said constructive solid geometry representation.

7. The method of claim 6 wherein said information is selected from a group consisting of volume, surface area of faces of said object, parallelism of face surfaces, face surface finish, face surface treatment and hole threading information.

8. The method of claim 1 wherein said step of cleaving comprising:
   representing extended surfaces of said object which do not intersect a portion of the described volume of said object as grazing surfaces;
   representing all other extended surfaces of said object as sectioning surfaces;
   converting said grazing surfaces into half-spaces by providing a representation associated with each said grazing surface specifying which side of said surface said object resides;
   forming an enclosing body from the intersection of said half-spaces;
   subtracting the object represented by said boundary representation from said enclosing body to define the material to remove;
   sectioning said object with all intersecting said sectioning surfaces to form positive atomic geometrical unit (I-bodies);
   identifying each surface of each said positive I-body as a unique facelet shared only by an adjacent atomic geometrical unit;
   sectioning said material to be removed with all intersecting said sectioning surfaces to form negative atomic geometrical units (I-bodies); and
   identifying each surface of each said negative I-body as a unique facelet shared only by an adjacent atomic geometrical unit.

9. The method of claim 8 wherein an I-group is a elemental geometric unit or shape which is the union of a set of non-overlapping I-bodies, said step of assembling comprising:
   initially utilizing an enclosing I-group as a possible solution to begin assembly evaluation;
   searching said possible solution for all pure positive I-groups;
   deleting any pure negative I-groups in said possible solution to redefine said possible solution;
   replacing any mixed I-group with a set of possible construction choices; said possible construction choices being heuristically determined;
   looking ahead to future recursions of said steps of searching, deleting and replacing for each of said possible construction choices to determine their relative feasilibity;
   heuristically determining the best possible construction choices;
   making said best possible construction choices newly selected possible solutions;
   developing a constructive solid geometry solution by;
      recursively repeating said steps of searching, deleting, replacing, looking ahead and heuristically determining on said newly selected possible solutions until said step of searching detects all pure positive I-groups indicating a solution has been reached.

10. The method of claim 9 wherein said step of searching includes replacing each said pure positive I-group with an intersection of half-spaces repesentation;
   said step of developing further comprising converting said half-space representations developed by said step of replacing into constructive solid geometry solutions subsequent to said step of recursively repeating.

11. The method of claim 1 wherein an I-group is a non-elemental geometric unit or shape which is the union of a set of non-overlapping I-bodies;
   said step of assembling comprising:
   initially utilizing an enclosing I-group defining a possible solution comprising the set of all positive I-bodies and all negative I-bodies to begin assembly evaluation;
   searching said possible solution for all pure positive I-groups;
   deleting any pure negative I-groups in said possible solution to redefine said possible solution;
   replacing any mixed I-group with a set of possible construction choices,;
   heuristically determining the best possible construction choices of said set based upon a particular user's manufacturing capabilities;
   making said best possible construction chocies newly selected possible solutions; and
   developing a constructive solid geometry solution by recursively repeating said steps of searching, deleting, replacing, and heuristically determining on said newly selected possible solutions until said step of searching detects all pure positive I-groups, thereby indicating a solution has been reached.

12. The method of claim 11 wherein said step of searching includes replacing all said pure positive I-groups with intersection of half-space representations;
   said step of developing further comprising converting said half-space representations developed by said step of replacing into constructive solid geometry solutions subsequent to said step of recursively repeating.

13. The method of claim 11 wherein said step of searching further includes looking ahead to further recursions of said steps of searching, deleting and replacing for each of said possible construction choices to determine their relative feasibility.

14. The method of claim 11 wherein each possible solution has at most a single mixed I-group contained therein including both positive and negative I-bodies.

15. The method of claim 14 wherein said step of replacing includes developing a total minus negatives possible construction choice including:
   (a) identifying each I-body within the mixed I-group of said possible solution;
   (b) identifying a negative I-body within said mixed I-group;
   (c) finding all negative I-bodies within said mixed I-group connected to said identified negative I-body;
   (d) forming a complete I-group by adding I-bodies to said connected negative I-bodies, said I-group being defined by the surfaces grazing said connected negative I-bodies;
   (e) subtracting said completed I-group developed by step (d) from mixed I-group;
   (f) repeating steps b-e with said remaining mixed I-group until all negative I-bodies are part of a completed I-group to form said total minus negatives possible constructions choice.

16. The method of claim 15, wherein said step of forming includes the steps of:
   locating missing facelets of said complete I-group;

determining if any I-bodies within said complete I-group are missing from said set of connected negative I-bodies using said located missing facelets;

adding said missing I-bodies to said connected negative I-bodies to form said completed I-group.

17. The method of claim 16 wherein said step of locating missing facelets includes the steps of:

identifying have-facelets, the union of all facelets of the individual I-bodies in said set of connected I-bodies;

identifying host of facelets as have-facelets which form part of each said grazing surfaces;

forming a set of mated facelets including said host facelets and those facelets which have duplicates within the set of said have-facelets;

forming a set of non-mated facelets including all facelets of I-bodies within said I-groups defined by said grazing surfaces of said connected negative I-bodies;

adding said non-mated facelets to a set of missing faces;

determining if said set of non-mated facelets or said set of mated facelets is null, signifying completion of said step of locating missing facelets;

repeating said steps of identifying have-facelets, identifying host of facelets, forming a set of mated facelets, forming a set of non-mated facelets, and adding if neither said set of mated facelets or said set of unmated facelets are null.

18. The method of claim 15 wherein said step of finding all negative I-bodies connected to said identified negative I-body comprises:

using said identified negative I-body as a seed unit;

identifying all facelets of said seed unit;

determining which of said negative I-bodies within said mixed group have facelets corresponding to the facelets of said seed unit;

adding said negative I-bodies having corresponding facelets to said seed unit to form a larger seed unit;

repeating said steps of identifying, determining, and adding until all negative I-bodies connected to said identified negative I-body are adding together.

19. The method of claim 15 wherein said step of developing a total minus negatives possible construction choice further comprises determining the presence of cycling by determining if said mixed I-group is the same as said connected negative I-bodies, said step of subtracting occurring when cycling is not determined.

20. The method of claim 14 wherein said step of replacing includes developing a union of positives possible construction choice including:

identifying each I-body within the mixed I-group of said possible solution;

identifying a positive I-body within said mixed I-group;

finding all positive I-bodies within said mixed I-group connected to said identified positive I-body;

forming a completed I-group by adding I-bodies to said connected positive I-bodies, said completed I-group being defined by the surfaces grazing the completed set of said connected positive I-bodies;

substituting said completed I-grouped for said mixed I-group in said possible solution to form a union of positive possible construction choice.

21. The method of claim 20 wherein said step of forming includes the steps of:

locating missing facelets of said complete I-group;

determining if any I-bodies within said complete I-group are missing from said set of connected positive I-bodies using said located missing facelets;

adding said missing I-bodies to form said completed I-group.

22. The method of claim 21 wherein said step of locating missing facelets includes the steps of:

identifying have-facelets as the union of all facelets of the individual I-bodies in said set of connected I-bodies;

identifying host of facelets as have-facelets which form part of each said grazing surfaces;

forming a set of mated facelets including said host facelets and those facelets which have duplicates within the set of said have-facelets;

forming a set of non-mated facelets including all facelets of I-bodies within said I-group defined by said grazing surfaces of said connected positive I-bodies;

adding said non-mated facelets to a set of missing facelets;

determining if said set of non-mated facelets or said set of mated facelets is null, signifying completing of said step of locating missing facelets;

repeating said steps of identifying have-facelets, identifying host of facelets, forming a set of mated facelets, surfaces of said object as sectioning surfaces;

means responsive to said first means for representing for converting said grazing surfaces into halfspaces by providing a representation associated with each said grazing surface specifying on which side of said surface said object resdies;

defining the material to remove from said enclosed body;

first means, responsive to said second means for representing, for sectioning said object with all intersecting said sectioning surfaces to form positive elemental atomic geometrical units (I-bodies);

second means, responsive to said second means for representing, for sectioning said material to be removed with all intersecting said sectioning surfaces to form negative elemental atomic geometrical units (I-bodies).

23. The method of claim 20 wherein said step of finding all positive I-bodies connected to said identified positive I-body comprises:

using said identified positive I-body as a seed unit;

identifying all facelets of said seed unit;

determining which of sid positive I-bodies within said mixed group have facelets corresponding to the facelets of said seed unit;

adding said positive I-bodies having corresponding facelets to said seed unit to form a larger seed unit;

repeating said steps of identifying, determining, and adding until all positive I-bodies connected to said identified negative I-body are added together.

24. The method of claim 20 further comprising determining the presence of cycling by determining if said mixed I-group is the same as said set of completed connected positive I-bodies, the detection of cycling inhibiting said step of substituting.

25. The method of claim 14 wherein said step of replacing includes developing a union of sections possible construction choice including:

identifying a sectioning surface in the mixed I-group of said possible solutions;

dividing the mixed I-group into first and second subgroups defined by said sectioning surface;

producing a possible expression of the union of said first and second sub-groups;

iterating said step of identifying, dividing and producing for each sectioning surface of said mixed I-group to form additional possible expressions; and heuristically selecting the best expression from said possible expressions.

26. The method of claim 1 wherein said zero, one and two dimensional features are vertices, edges and surfaces, respectively.

27. The method of claim 1 wherein said step of controlling said machine controls said machine to manufacture substantially all of said object.

28. A method manufacturing an object from a boundary representation thereof comprising:

cleaving said boundary representation of said object, which represents said object only by zero, one or two dimensional features thereof, into elemental atomic geometrical units (I-bodies);

assemblies said I-bodies into assemblies having atomic geometrical forms which collectively form a constructive half-space geometry representation of said object usable for manufacturing thereof;

utilizing said constructive solid geometry representation of said object to develop machine instructions for instructing one or more machines in a manufacturing process; and controlling said machines to perform operations under control of said instructions to manufacture at least a portion of said object.

29. The method of claim 28 further comprising the step of representing said I-bodies in symbolic form;

said step of assembling utilizing the symbolic forms of said I-bodies.

30. The method of claim 28 wherein said zero, one and two dimensional features are vertices, edges and surfaces, respectively.

31. The method of claim 28 wherein said step of controlling said machine controls said machine to manufacture substantially all of said object.

32. A system of manufacturing an object from a boundary representation thereof comprising:

means for cleaving said boundary representation of said object, which represents said object only by zero, one or two dimensional features thereof, into elemental atomic geometrical units (I-bodies);

means responsive to said means for cleaving for assembling said I-bodies into assemblies having atomic geometrical forms which collectively form a constructive solid geometry representation of said object;

means for developing machine instructions for instructing one or more machines in a manufacturing process from said constructive solid geometry representation of said object; and manufacturing means, responsive to said machine instructions and including one or more machines, for manufacturing said object.

33. The system of claim 32 further comprising means for representing said I-bodies in symbolic form;

said means for assembling utilizing the symbolic forms of said I-bodies developed by said means for representing.

34. The system of claim 33 wherein said means for representing comprises:

means for factually representing each I-body as a plurality of atomic constituent facts;

means responsive to said means for factually representing for mapping said atomic constituent facts so as to interrelate said facts, said facts describing said I-body in symbolic form.

35. The system of claim 32 wherein said means for cleaving includes means for sectioning said object surfaces to divide said object into I-bodies.

36. The system of claim 32 wherein said means for cleaving includes means for defining said I-bodies with the intersection of half-spaces, said means for cleaving further including:

first means for representing extended surfaces of said object which do not intersect a portion of the described volume of said object as grazing surfaces;

second means for representing all other extended surfaces of said object as sectioning surfaces;

means responsive to said first means for representing for converting said grazing surfaces into halfspaces by providing a representation associated with each said grazing surface specifying on which side of said surface said object resides;

defining the material to remove from said enclosed body;

first means, responsive to said second means for representing, for sectioning said object with all intersecting said sectioning surfaces to form positive elemental atomic geometrical units (I-bodies);

second means, responsive to said second means for representing, for sectioning said material to be removed with all intersecting said sectioning surfaces to form negative elemental atomic geometrical units (I-bodies).

37. The system of claim 32 further comprising:

means for transferring information contained in the boundary representation of said object to said constructive solid representation of said object to said constructive solid geometry representation thereof.

38. The system of claim 37 wherein said information is selected from a group consisting of volume, surface area of faces of said object, parallelism of face surfaces, face surface finish, face surface treatment and hole threading information.

39. The system of claim 32 wherein said means of cleaving comprises:

first means for representing extended surfaces of said object which do not intersect a portion of the described volume of said object as grazing surfaces;

second means for representing all other extended surfaces of said object as sectioning surfaces;

means, responsive to said first means for representing for converting said grazing surfaces into halfspaces by providing a representation associated with each said grazing surface specifying which side of said surface said object resides;

means, responsive to said means for converting for forming an enclosing body from the intersection of said halfspaces;

means, responsive to said means for forming, for subtracting the object represented by said boundary representation from said enclosing body to define the material to remove;

first means, responsive to said second means representing, for sectioning said object with all intersecting said sectioning surfaces to form positive I-bodies units;

first means, responsive to said first means for sectioning, for identifying each surface of each said positive I-body as a unique facelet shared only by an adjacent atomic geometrical unit;

second means, responsive to said means for subtracting and said second means, for representing sectioning said material to be removed with all intersecting said sectioning surfaces to form negative atomic geometrical units (I-bodies); and second means, responsive to said second means for sectioning, for identifying each surface of each said negative I-body as a unique facelet shared only by an adjacent atomic geometrical unit.

40. The system of claim 32 wherein said zero, one and two dimensional features are vertices, edges, and surfaces, respectively.

41. The system of claim 32 wherein said manufacturing means manufactures substantially all of said object.

* * * * *